(12) United States Patent
Duan et al.

(10) Patent No.: US 11,818,683 B2
(45) Date of Patent: *Nov. 14, 2023

(54) GEOMETRIC DILUTION OF PRECISION BASED TRANSMIT/RECEIVE POINT SELECTION FOR WIRELESS POSITIONING

(71) Applicant: QUALCOMM Incorporated, San Diego, CA (US)

(72) Inventors: Weimin Duan, San Diego, CA (US); Alexandros Manolakos, Escondido, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/054,417

(22) Filed: Nov. 10, 2022

(65) Prior Publication Data

US 2023/0069865 A1  Mar. 9, 2023

Related U.S. Application Data

(63) Continuation of application No. 17/218,418, filed on Mar. 31, 2021, now Pat. No. 11,533,700.

(51) Int. Cl.
*H04W 64/00* (2009.01)
*H04B 17/27* (2015.01)
(Continued)

(52) U.S. Cl.
CPC .......... *H04W 64/003* (2013.01); *H04B 17/27* (2015.01); *H04B 17/318* (2015.01); *H04B 17/336* (2015.01)

(58) Field of Classification Search
CPC .................. H04W 64/003; H04B 17/27; H04B 17/318; H04B 17/336
(Continued)

(56) References Cited

U.S. PATENT DOCUMENTS 9,797,983 B1  10/2017  Bitra et al.
2010/0273504 A1*  10/2010  Bull ........................ H04K 3/65
455/456.1
(Continued)

FOREIGN PATENT DOCUMENTS

WO  2020067964 A1  4/2020

OTHER PUBLICATIONS

International Search Report and Written Opinion—PCT/US2022/014030—ISA/EPO—dated Jul. 21, 2022.
(Continued)

*Primary Examiner* — Don N Vo

(57) ABSTRACT

Wireless positioning accuracy of a user equipment (UE) is impacted by locations of the transmit/receive points (TRPs) and UE for wireless positioning. To improve the accuracy of estimated locations, a geometric dilution of precision (GDOP) may be determined for different groups of candidate TRPs, with the GDOP indicating a potential positioning error associated with the group of candidate TRPs. A UE may determine GDOPs for different combinations of candidate TRPs. One or more devices of a wireless network (e.g., a location server and/or a UE for positioning) may select or exclude one or more candidate TRPs from being used for wireless positioning of a UE based on the determined GDOPs. Exclusion or selection of candidate TRPs for wireless positioning may also be based on quality measurements of PRSs (such as an RSRP or SNR) or a time duration associated with measuring the PRSs from the candidate TRPs to be selected.

30 Claims, 11 Drawing Sheets

(51) Int. Cl.
 *H04B 17/318* (2015.01)
 *H04B 17/336* (2015.01)
(58) Field of Classification Search
 USPC ..................................................... 455/456.1
 See application file for complete search history.

(56) References Cited

U.S. PATENT DOCUMENTS

| | | |
|---|---|---|
| 2018/0035251 A1 | 2/2018 | Bitra |
| 2018/0332430 A1 | 11/2018 | Kumar et al. |
| 2019/0053013 A1* | 2/2019 | Markhovsky ....... H04L 43/0864 |
| 2020/0267684 A1 | 8/2020 | Huang et al. |
| 2020/0267685 A1 | 8/2020 | Qi |
| 2022/0113365 A1 | 4/2022 | Sosnin et al. |
| 2022/0322277 A1 | 10/2022 | Duan et al. |

OTHER PUBLICATIONS

Partial International Search Report—PCT/US2022/014030—ISA/EPO—dated May 30, 2022.

* cited by examiner

GEOMETRIC DILUTION OF PRECISION BASED TRANSMIT/RECEIVE POINT SELECTION FOR WIRELESS POSITIONING

CROSS-REFERENCE TO RELATED APPLICATIONS

This application is a continuation of U.S. application Ser. No. 17/218,418, entitled "GEOMETRIC DILUTION OF PRECISION BASED TRANSMIT/RECEIVE POINT SELECTION FOR WIRELESS POSITIONING" and filed on Mar. 31, 2021, which is expressly incorporated by reference herein in its entirety.

BACKGROUND

Field

Subject matter disclosed herein relates to wireless positioning of user equipment using received positioning reference signals and more particularly to selection of transmit/receive points (TRPs) to be used for wireless positioning based on geometric dilutions of precision determined for different groups of candidate TRPs.

Information

The location of a user equipment (UE), such as a cellular telephone, may be useful or essential to a number of applications including emergency calls, navigation, direction finding, asset tracking and Internet service. The location of a UE may be estimated based on information gathered from various systems. In a cellular network implemented according to 4G (also referred to as Fourth Generation) Long Term Evolution (LTE) radio access or 5G (also referred to as Fifth Generation) "New Radio" (NR), for example, a base station may transmit downlink reference signals or a UE may transmit sidelink reference signals that are used for positioning, such as a positioning reference signal (PRS). Assistance data is sent to a UE to assist in acquiring and measuring signals, and in some implementations, to compute a location estimate from the measurements. A UE may acquire PRSs transmitted from different base stations or UEs and perform positioning measurements such as Reference Signal Time Difference (RSTD), Reference Signal Received Power (RSRP), and reception and transmission (RX-TX) time difference measurements, which may be used in various positioning methods, such as Time Difference of Arrival (TDOA), Angle of Departure (AoD), and multi-cell Round Trip Time (RTT). The UE may compute an estimate of its own location using various positioning methods or may send the positioning measurements to a network entity, e.g., location server, which may compute the UE location based on the positioning measurements. Improvements in accuracy in positioning are desirable.

SUMMARY

Wireless positioning accuracy of a user equipment (UE) is impacted by the locations of the transmit/receive points (TRPs) used for wireless positioning and the location of the UE. To improve the accuracy of locations estimated for a UE, a geometric dilution of precision (GDOP) may be determined for different groups of candidate TRPs, with the GDOP indicating a potential positioning error associated with the group of candidate TRPs. A UE may determine GDOPs for different combinations of candidate TRPs within range of the UE. One or more devices of a wireless network (e.g., a location server and/or a target UE for positioning) may select or exclude one or more candidate TRPs from being used for wireless positioning based on the determined GDOPs. Exclusion or selection of candidate TRPs for wireless positioning may also be based on quality measurements of positioning reference signals (PRSs) (such as an RSRP or SNR) or a time duration associated with measuring the PRSs from the candidate TRPs to be selected.

In one implementation, a method in a wireless network for wireless positioning of a UE may be performed by the UE. The method includes determining one or more GDOPs, including, for each combination of candidate TRPs of one or more combinations of candidate TRPs from a plurality of candidate TRPs for wireless positioning, determining a GDOP associated with the combination of candidate TRPs. The method also includes providing, to a network entity in the wireless network, an indication associated with the one or more GDOPs. One or more candidate TRPs of the plurality of candidate TRPs are to be used by the UE for wireless positioning of the UE based on the indication.

In one implementation, a UE in a wireless network configured for wireless positioning of the UE includes at least one transceiver, at least one memory, and at least one processor coupled to the at least one transceiver and the at least one memory. The at least one transceiver is configured to provide, to a network entity in the wireless network, an indication associated with one or more GDOPs, with one or more candidate TRPs of a plurality of candidate TRPs to be used by the UE for wireless positioning of the UE based on the indication. The at least one processor is configured to determine the one or more GDOPs associated with the indication, including, for each combination of candidate TRPs of one or more combinations of candidate TRPs from the plurality of candidate TRPs for wireless positioning, determine a GDOP associated with the combination of candidate TRPs.

In one implementation, a non-transitory computer-readable medium storing instructions that, when executed by at least one processor of a UE in a wireless network configured for wireless positioning of the UE, causes the UE to: determine one or more GDOPs, including, for each combination of candidate TRPs of one or more combinations of TRPs from a plurality of candidate TRPs for wireless positioning, determine, via the at least one processor, a GDOP associated with the combination of candidate TRPs; and provide, via at least one transceiver of the UE and to a network entity in the wireless network, an indication associated with the one or more GDOPs, wherein one or more candidate TRPs of the plurality of candidate TRPs are to be used by the UE for wireless positioning of the UE based on the indication.

In one implementation, a UE in a wireless network for wireless positioning of the UE includes means for determining one or more GDOPs. The means for determining the one or more GDOPs includes means for, for each combination of candidate TRPs of one or more combinations of candidate TRPs from a plurality of candidate TRPs for wireless positioning, determining a GDOP associated with the combination of candidate TRPs. The UE also includes means for providing, to a network entity in the wireless network, an indication associated with the one or more GDOPs, wherein one or more candidate TRPs of the plurality of candidate TRPs are to be used by the UE for wireless positioning of the UE based on the indication.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
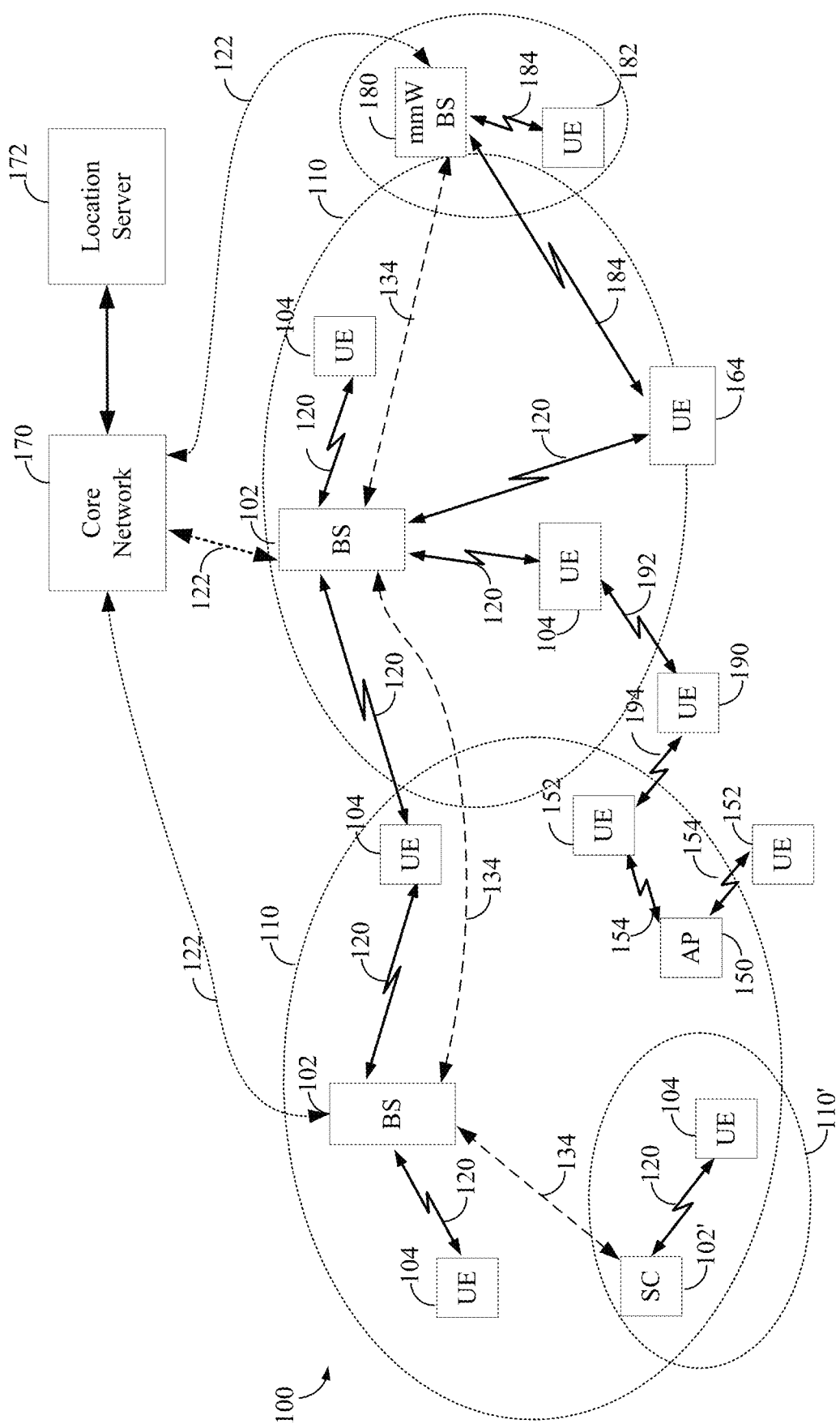
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the IEEE 802.11 set of standards, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNodeB or gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). A communication link through which UEs can send signals to or from each other is called a sidelink (SL). As used herein, the term traffic channel (TCH) can refer to either an UL/reverse or DL/forward traffic channel.

The term "base station" may refer to a single physical transmission-reception point (TRP, which may also be referred to as a transmit-receive point) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). In some implementations, a TRP may be a UE.

To support wireless positioning of a UE, two broad classes of positioning solutions have been defined: control plane based and user plane based. With reference to control plane (CP) positioning, signaling related to positioning and support of positioning may be carried over existing network (and UE) interfaces and using existing protocols dedicated to the transfer of signaling. With reference to user plane (UP) positioning, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane positioning solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). For UP positioning, release 16 of the 3GPP standard for NR defines multi-cell round trip time (RTT), DL angle of departure (AOD), and UL angle of arrival (AOA) with zenith and azimuth. Release 16 also defines UE-based positioning associated with DL-TDOA and DL-AOD, DL-positioning reference signal (PRS) (DL-PRS), and sounding reference signal (SRS) for positioning. Release 16 also defines beam-specific PRS operation for mmWave and broadcasting of assistance data for positioning. Release 17 of the 3GPP standard for NR may define UE-initiated one-demand transmission of a DL-PRS, network-initiated on-demand transmission of a DL-PRS, Radio Resource Control (RRC) inactive DL-only, UL-only, or DL+UL based positioning, access point (AP) DL-PRS transmission, and/or aggregation of DL-PRS across multiple frequencies. The Open Mobile Alliance (OMA) has similarly defined a UP positioning solution known as Secure User Plane Location (SUPL), which can be used to locate a UE accessing any of a number of radio interfaces that support IP packet access such as General Packet Radio Service (GPRS) with GSM, GPRS with UMTS, or IP access with LTE or NR.

Both CP and UP based positioning (also referred to as location) solutions may employ a location server to support positioning (location) of a UE. The location server may be part of or accessible from a serving network or a home network for a UE or may simply be accessible over the Internet or over a local Intranet. If positioning of a UE is needed, a location server may instigate a session (e.g., a location session or a SUPL session) with the UE and coordinate location measurements by the UE and determination of an estimated location of the UE. During a location session, a location server may request positioning capabilities of the UE (or the UE may provide them without a request), may provide assistance data to the UE (e.g., if requested by the UE or in the absence of a request) and may request a location estimate or location measurements from a UE for various positioning techniques, e.g., for the Global Navigation Satellite System (GNSS), Time Difference of Arrival (TDOA), Angle of Departure (AoD), Round Trip Time (RTT) or multi cell RTT (Multi-RTT), and/or Enhanced Cell ID (ECID) position methods. Assistance data may be used by a UE to acquire and measure GNSS and/or PRS signals (e.g., by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AoD, Multi-RTT, etc.).

In a UE assisted mode of operation, a UE may return location measurements to a location server which may determine an estimated location of the UE based on these measurements and possibly based also on other known or configured data (e.g., satellite ephemeris data for GNSS location or base station characteristics including base station locations and possibly PRS timing in the case of terrestrial positioning using, e.g., TDOA, AoD, Multi-RTT, etc.).

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, a location server and UE may exchange messages defined according to one or more positioning protocols in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNodeB or gNB) for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message A location server and a base station (e.g., an eNodeB for LTE access or a gNodeB for NR access) may exchange messages to enable the location server to (i) obtain position measurements for a particular UE from the base station, or (ii) obtain location information from the base station not related to a particular UE such as the location coordinates of an antenna for the base station, the cells (e.g., cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB (eNB) and a location server that is an E-SMLC. In the case of NR access, the NRPPA protocol may be used to transfer such messages between a base station that is a gNodeB (gNB) and a location server that is an LMF. It is noted that the terms "parameter" and "information element" (IE) are synonymous and are used interchangeably herein.

During positioning using signaling in LTE and 5G NR, a UE typically acquires dedicated positioning signals transmitted by base stations, e.g., positioning reference signals (PRS), which are used to generate the desired measurements for the supported positioning technique. PRSs are defined for 5G NR positioning to enable UEs to detect and measure signals from one or more base stations, which may act as Transmission and Reception Points (TRPs, which may also be referred to as transmit/receive points). For example, a UE may receive and measure one or more metrics associated with a downlink (DL) PRS from a serving base station (which may also be referred to as a reference base station) and one or more neighboring stations. Based on the time of arrival (TOA) of the PRS from the serving and neighboring base stations, the UE may generate DL Reference Signal Time Difference (RSTD) for DL TDOA positioning, sometimes referred to as Observed Time Difference of Arrival (OTDOA). In a similar process, the UE may transmit uplink reference signals for positioning, referred to as Sounding Reference Signals (SRS) for positioning to a serving base station and neighboring base stations. The TOAs of the SRS at the serving and neighboring stations may be used to generate an UL RSTD for UL TDOA positioning, sometimes referred to as Uplink Time Difference of Arrival (UTDOA).

As described above, a base station may be a transmit/receive point (TRP) to be used for UE positioning. For example, base stations may provide PRSs over a UP interface (referred to as a Uu interface, such as a LTE-Uu or a NR-Uu). Also or alternatively, base stations may provide PRSs over a CP interface (such as described above). While at least three base stations may be needed as TRPs for two-dimensional (2D) wireless positioning of a target UE (without reference to height) or at least four base stations may be needed as TRPs for three-dimensional (3D) wireless positioning of the target UE, more than three base stations (for 2D positioning) or four base stations (for 3D positioning) that can be used for wireless positioning (referred to as candidate TRPs herein) may be within range of a target UE. One or more candidate TRPs may be selected or excluded for wireless positioning of the target UE, the selected candidate TRPs may be configured as TRPs to transmit PRSs or perform other positioning signaling, and the target UE may be configured to sense the PRSs from the configured TRPs, with measurements of the PRSs used to determine a location of the target UE. While some of the below examples may describe aspects of the disclosure with reference to 2D positioning for clarity, the disclosure also applies to 3D positioning or for any number of TRPs to be used for wireless positioning.

The candidate TRPs to be selected for or excluded from wireless positioning of one or more UEs may be based on the locations of the candidate TRPs. For example, if three TRPs are used for estimating a 2D location of a target UE within range of the three TRPs or if four TRPs are used for estimating a 3D location of a target UE within range of the four TRPs, the accuracy or potential error of the estimated 2D or 3D location may be dependent on the locations of the TRPs with reference to each and the target UE. If the target UE is within range of a plurality of candidate TRPs greater than three for 2D positioning or four for 3D positioning, different subsets of the candidate TRPs may be associated with different accuracies of an estimated 2D or 3D location of the target UE. A subset of candidate TRPs may be selected for wireless positioning to reduce the potential error in an estimated location of a UE. The potential error may be measured by determining a geometric dilution of precision (GDOP) for a plurality of subsets of candidate TRPs, which is described in more detail below with reference to FIGS. 7A and 7B.

In some implementations, a GDOP may be determined for different groups of candidate TRPs, with the GDOP indicating a potential error associated with the group of candidate TRPs. For example, a UE may determine GDOPs for different combinations of candidate TRPs within range of the UE. One or more devices of a wireless network (e.g., a location server and/or a target UE for positioning) may select or exclude one or more candidate TRPs from being used for wireless positioning based on the determined GDOPs. For example, the UE may downselect a group of candidate TRPs (i.e., filter or exclude one or more of the candidate TRPs from the group of candidate TRPs) based on the GDOPs, and a location server may select the final TRPs from the remaining candidate TRPs in the group. In another example, the UE may determine one or more preferred candidate TRPs based on the GDOPs, and the location server may select the final TRPs based on the preferred candidate TRPs from the UE. In another example, the location server may determine the final TRPs based on GDOPs indicated by the UE towards the location server (such as via a base station and core network). Example implementations for determining the GDOPs, signaling indications associated with the determined GDOPs, and/or selecting or excluding candidate TRPs based on the determined GDOPs are described in more detail below.

FIG. 1 illustrates an exemplary wireless communications system 100. The wireless communications system 100 (which may also be referred to as a wireless wide area network (WWAN) or a wireless network, such as a cellular network) may include various base stations 102 and various UEs 104, which one or more of the base stations 102 and/or UEs 104 may sometimes be referred to herein as TRPs 102 or 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to a location server 172, which may include one or more location servers. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station or UE (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to points in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength or quality (e.g., reference signal received power (RSRP), reference signal received quality (RSRQ), signal-to-interference-plus-noise ratio (SINR), signal-to-noise ratio (SNR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more sidelinks (SLs), such as device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. In the example, the UE 190 may be a relay UE between the UE and a base station 102. One or multiple UEs may be relay UEs between a device and a base station.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

A target UE 104 for wireless positioning may be within wireless range of a plurality of base stations 102 (which may be candidate TRPs 102 for wireless positioning of the target UE 104). A TRP or a candidate TRP may also be referred to as an anchor base station. An anchor base station may transmit a PRS on a DL (DL-PRS) to one or more target UEs, and the PRSs may be measured at the one or more target UEs to determine one or more metrics used in estimating a location of the one or more target UEs. As described, in general, wireless positioning is based on signaling between a plurality of base stations 102 (such as gNBs for NR access) and one or more target UEs 104 in the wireless network 100.

Figure 2:
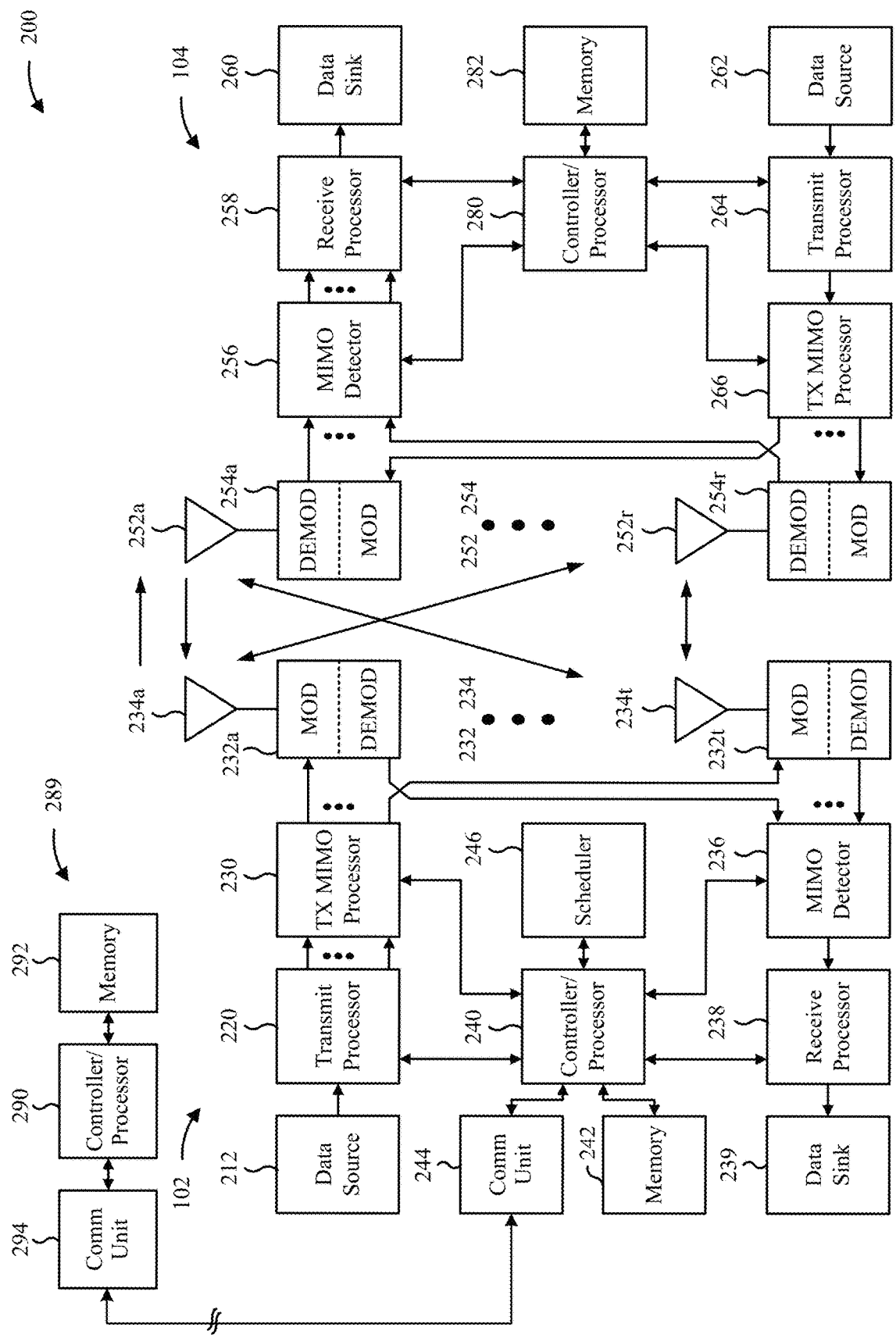
FIG. 2 illustrates a block diagram of a design of base station and user equipment (UE), which may be one of the base stations and one of the UEs in FIG. 1.

FIG. 2 shows a block diagram of a design 200 of a base station 102 and a UE 104, which may be one of the base stations and one of the UEs in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 104, antennas 252a through 252r may receive the downlink signals from base station 102 and/or other base stations and may provide received signals to demodulators (DEMODs) 254a through 254r, respectively. Each demodulator 254 may condition (e.g., filter, amplify, down convert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 102. At base station 102, the uplink signals from UE 104 and other UEs may be received by antennas 234, processed by demodulators 232, detected by a MIMO detector 236 if applicable, and further processed by a receive processor 238 to obtain decoded data and control information sent by UE 104. Receive processor 238 may provide the decoded data to a data sink 239 and the decoded control information to controller/processor 240. Base station 102 may include communication unit 244 and communicate to network controller 289 via communication unit 244. Network controller 289 may include communication unit 294, controller/processor 290, and memory 292. The network controller may be included in or communicably coupled to a location server 172 (or a core network component).

Controller/processor 240 of base station 102, controller/processor 280 of UE 104, controller 290 of network controller 289, which may be included in a location server 172, and/or any other component(s) of FIG. 2 may perform one or more techniques associated with supporting positioning services for a UE, as described in more detail elsewhere herein. For example, controller/processor 240 of base station 102, controller 290 of network controller 289, controller/processor 280 of UE 104, and/or any other component(s) of FIG. 2 may perform or direct operations of, for example, the processes depicted in the Figures and as described herein. Memories 242, 282, and 292 may store data and program codes for base station 102, UE 104, and network controller 289, respectively. In some aspects, memory 242 and/or memory 282 and/or memory 292 may include a non-transitory computer-readable medium storing one or more instructions for wireless communication. For example, the one or more instructions, when executed by one or more processors of base station 102, network controller 289, and/or the UE 104 may perform or direct operations of the processes described herein. A scheduler 246 may schedule UEs for data transmission on the downlink and/or uplink.

The location server 172 (which may include the network controller 289) may be configured to exclude or select the TRPs for wireless positioning, determine and indicate the resources to be used for wireless positioning (such as specific RS resources or formats of the PRSs), determine a position of one or more UEs in the wireless network, store positioning information for the one or more UEs, or perform other operations associated with wireless positioning of one or more UEs in the wireless network 100. The positioning information may be used for various operations, such as cell selection, handover, beamforming, or locationing or other aspects of a wireless network 100.

As indicated above, FIG. 2 is provided as an example. Other examples may differ from what is described with regard to FIG. 2. For example, while FIG. 2 depicts communication between a base station 102 and a UE 104, communications may occur between two UEs 104 over a sidelink. In this manner, a UE 104 design and another UE 104 design as depicted in FIG. 2 may communicate with each other over a sidelink. For example, to communicate an indication of one or more GDOPs, preferred candidate TRPs for wireless positioning, or other information intended for the location server 172, a UE 104 may communicate the information to a relay UE, which may relay the information to a base station 102 that relays the information towards the location server 172.

A base station may broadcast, unicast, or groupcast one or more PRSs in a wireless network (such as in a cellular network including LTE technologies and/or 5G technologies). In a frequency domain, an available bandwidth may be divided into uniformly spaced orthogonal subcarriers (also referred to as "tones" or "bins"). For example, for a normal length cyclic prefix (CP) using, for example, 15 kHz spacing, subcarriers may be grouped into a group of twelve (12) subcarriers. A resource of one OFDM symbol length in the time domain and one subcarrier in the frequency domain may be referred to as a resource element (RE). In the example, each grouping of 12 subcarriers and 14 OFDM symbols is termed a resource block (RB) and, in the example above, the number of subcarriers in the resource block may be written as $N_{SC}^{RB}=12$. For a given channel bandwidth, the number of available resource blocks on each channel, which is also called the transmission bandwidth configuration, is indicated as $N_{RB}^{DL}$. For example, for a 3 MHz channel bandwidth in the above example, the number of available resource blocks on each channel is given by $N_{RB}^{DL}=15$. Note that the frequency component of a resource block (e.g., the 12 subcarriers) is referred to as a physical resource block (PRB).

A base station may transmit radio frames, or other physical layer signaling sequences, supporting PRSs (i.e., a downlink (DL) PRS) according to frame configurations similar to the above example, which may be measured and used for a target UE position estimation. Other types of wireless nodes (e.g., a distributed antenna system (DAS), remote radio head (RRH), UE, AP, etc.) in a wireless network may also be configured to transmit PRS s configured in a manner similar to (or the same as) described above.

A collection of resource elements that are used for transmission of PRS s is referred to as a "PRS resource." The collection of resource elements can span multiple PRBs in the frequency domain and N (e.g., 1 or more) consecutive symbol(s) within a slot in the time domain. A "PRS resource set" is a set of PRS resources used for the transmission of PRSs, where each PRS resource has a PRS resource identifier (ID). In addition, the PRS resources in a PRS resource set are associated with the same TRP. A PRS resource ID in a PRS resource set is associated with a single beam transmitted from a single TRP (where a TRP may transmit one or more beams). Note that this does not have any implications on whether the TRPs and beams from which signals are transmitted are known to the UE.

A PRS may be transmitted in special positioning subframes that are grouped into positioning occasions. A PRS occasion is one instance of a periodically repeated time window (e.g., consecutive slot(s)) where PRSs are expected to be transmitted. Each periodically repeated time window can include a group of one or more consecutive PRS occasions. Each PRS occasion can include a number $N_{PRS}$ of consecutive positioning subframes. The PRS positioning occasions for a cell supported by a base station or a UE may occur periodically at intervals. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRSs between different cells overlap by occurring at the same or almost the same time. In this case, the PRS s from some cells may be muted while PRSs from other cells are transmitted (e.g., at a constant power). Muting may aid signal acquisition and time of arrival (TOA) and reference signal time difference (RSTD) measurement, by UEs, of PRSs that are not muted (by avoiding interference from PRS s that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station or a UE may support more than one PRS configuration, where each PRS configuration may include a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to a UE to enable the UE to perform PRS positioning measurements. In this manner, the UE may not be expected to blindly perform detection of PRS configurations. For example, a location server 172 may determine one or more PRS configurations for one or more TRPs (or candidate TRPs), and the configurations may be signaled to a UE via a base station (and, optionally, one or more relay UEs). The UE may use the configurations to sense the PRSs from the base stations for wireless positioning of the UE. Using received DL PRS s from base stations acting as candidate TRPs, the target UE may perform various measurements and determine a GDOP for different groups of base stations within range of the target UE. Other metrics that may be determined by the target UE include a link quality metric, e.g., a SNR or a RSRP.

Figure 3:
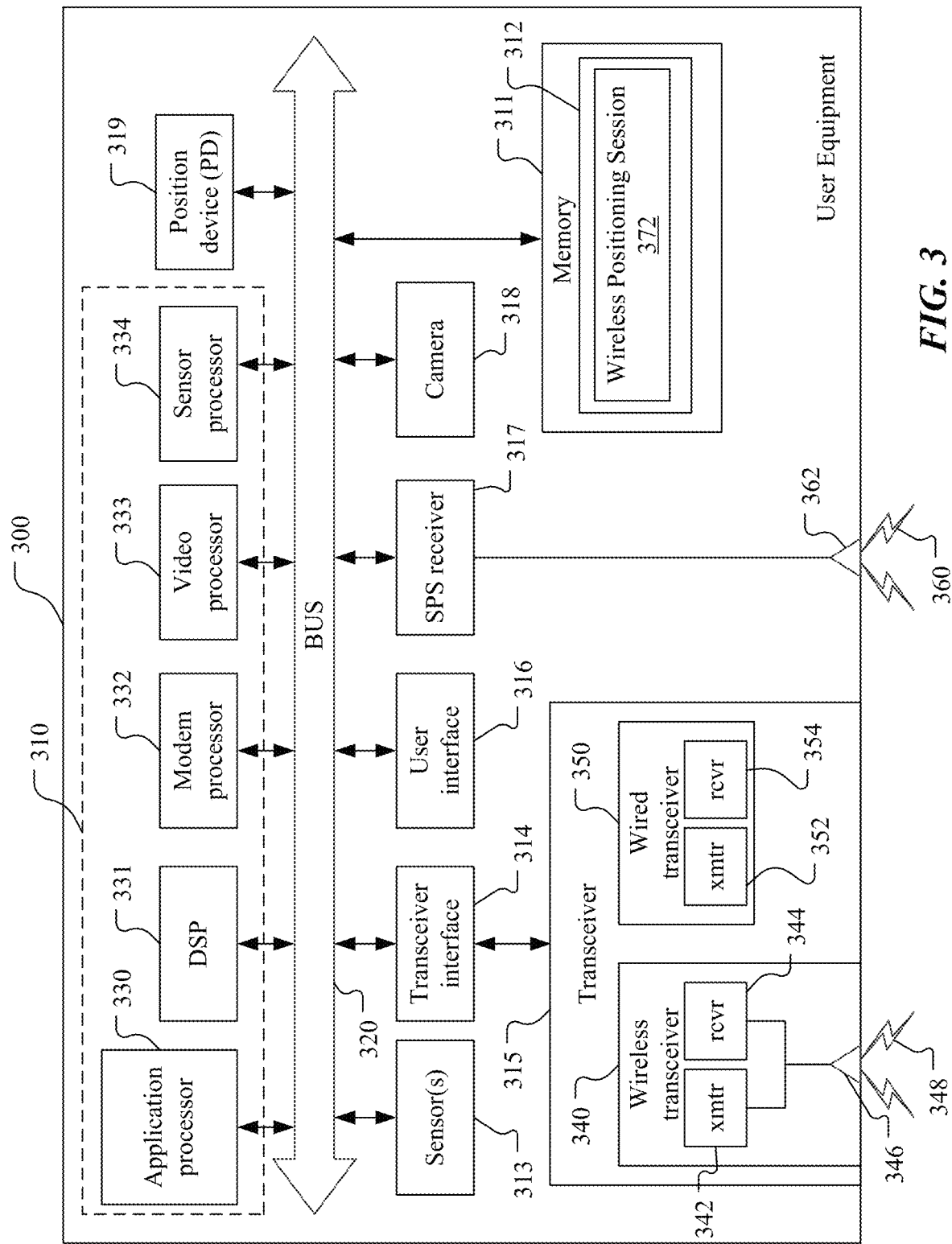
FIG. 3 illustrates a UE capable of supporting positioning services in a wireless network.

FIG. 3 illustrates a UE 300, which is an example of the UE 104, capable of supporting positioning services in a wireless network, such as the wireless network 100. The UE 300 includes a computing platform including at least one processor 310, memory 311 including software (SW) 312, one or more sensors 313, a transceiver interface 314 for a transceiver 315, a user interface 316, a Satellite Positioning System (SPS) receiver 317, a camera 318, and a position device (PD) 319. The processor 310, the memory 311, the sensor(s) 313, the transceiver interface 314, the user interface 316, the SPS receiver 317, the camera 318, and the position device 319 may be communicatively coupled to each other by a bus 320 (which may be configured, e.g., for optical and/or electrical communication). One or more of the shown apparatus (e.g., the camera 318, the SPS receiver 317, and/or one or more of the sensor(s) 313, etc.) may be omitted from the UE 300. The processor 310 may include one or more intelligent hardware devices, e.g., a central processing unit (CPU), a microcontroller, an application specific integrated circuit (ASIC), etc. The processor 310 may include multiple processors including an application processor 330, a Digital Signal Processor (DSP) 331, a modem processor 332, a video processor 333, and/or a sensor processor 334. One or more of the processors 330-334 may include multiple devices (e.g., multiple processors). For example, the sensor processor 334 may include, e.g., processors for radar, ultrasound, and/or lidar, etc. The modem processor 332 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 300 for connectivity. The memory 311 is a non-transitory storage medium that may include random access memory (RAM), flash memory, disc memory, and/or read-only memory (ROM), etc. The memory 311 stores the software 312 which may be processor-readable, processor-executable software code containing instructions that are configured to, when executed, cause the processor 310 to operate as a special purpose computer programmed to perform the various functions described herein. Alternatively, the software 312 may not be directly executable by the processor 310 but may be configured to cause the processor 310, e.g., when compiled and executed, to operate as a special purpose computer to perform the various functions described herein. The description may refer only to the processor 310 performing a function, but this includes other implementations such as where the processor 310 executes software and/or firmware. The description may refer to the processor 310 performing a function as shorthand for one or more of the processors 330-334 (and/or the position device (PD) 319) performing the function. The description may refer to the UE 300 performing a function as shorthand for one or more appropriate components of the UE 300 performing the function. The processor 310 may include a memory with stored instructions in addition to and/or instead of the memory 311.

The configuration of the UE 300 shown in FIG. 3 is an example and not limiting of the disclosure, including the claims, and other configurations may be used. For example, an example configuration of the UE includes one or more of the processors 330-334 of the processor 310, the memory 311, and the wireless transceiver 340. Other example configurations include the processor 310, the memory 311, the wireless transceiver 340, and one or more of the sensor(s) 313, the user interface 316, the SPS receiver 317, the camera 318, the PD 319, or the wired transceiver 350. As used herein, an at least one transceiver of a UE 300 may refer to one or more of a wireless transceiver 340 or a wired transceiver 350.

The UE 300 may include the modem processor 332 that may be capable of performing baseband processing of signals received and down-converted by the transceiver 315 and/or the SPS receiver 317. The modem processor 332 may perform baseband processing of signals to be upconverted for transmission by the transceiver 315. Also or alternatively, baseband processing may be performed by the processor 330 and/or the DSP 331. Other configurations, however, may be used to perform baseband processing. While the modem processor 332 is depicted as being included in processor 310, baseband processing may be referred to herein as being included in an at least one processor or a wireless transceiver of the UE 300 (or other suitable device of a wireless network).

The UE 300 may include the sensor(s) 313 that may include, for example, one or more of various types of sensors such as one or more inertial sensors, one or more barometric pressure sensors, one or more magnetometers, one or more environment sensors, one or more optical sensors, one or more weight sensors, and/or one or more radio frequency (RF) sensors, etc. An inertial measurement unit (IMU) may include, for example, one or more accelerometers (e.g., collectively responding to acceleration of the UE 300 in three dimensions) and/or one or more gyroscopes capable of detecting motion including rotation of the UE 300. The sensor(s) 313 may include one or more magnetometers to determine orientation (e.g., relative to magnetic north and/or true north) that may be used for any of a variety of purposes, e.g., to support one or more compass applications. The environment sensor(s) may include, for example, one or more temperature sensors, one or more barometric pressure sensors, one or more ambient light sensors, one or more camera imagers, and/or one or more microphones, etc. The sensor(s) 313 may generate analog and/or digital signals indications of which may be stored in the memory 311 and processed by the DSP 331 and/or the processor 330 in support of one or more applications such as, for example, applications directed to positioning and/or navigation operations.

The sensor(s) 313 may be used in relative location measurements, relative location determination, motion determination, etc. Information detected by the sensor(s) 313 may be used for motion detection, relative displacement, dead reckoning, sensor-based location determination, and/or sensor-assisted location determination. The sensor(s) 313 may be useful to determine whether the UE 300 is fixed (stationary) or mobile including rotating and/or whether to report certain useful information regarding the mobility of the UE 300. For example, based on the information obtained/measured by the sensor(s), the UE 300 may notify/report that the UE 300 has detected movements or that the UE 300 has moved, and report the relative displacement/distance (e.g., via dead reckoning, or sensor-based location determination, or sensor-assisted location determination enabled by the sensor(s) 313). In another example, for relative positioning information, the sensors/IMU can be used to determine the angle and/or orientation of another device with respect to the UE 300, etc.

The IMU may be configured to provide measurements about a direction of motion and/or a speed of motion of the UE 300, which may be used in relative location determination. For example, one or more accelerometers and/or one or more gyroscopes of the IMU may detect, respectively, a linear acceleration and a speed of rotation of the UE 300. The linear acceleration and speed of rotation measurements of the UE 300 may be integrated over time to determine an instantaneous direction of motion as well as a displacement of the UE 300. The instantaneous direction of motion and the displacement may be integrated to track a location of the UE 300. For example, a reference location of the UE 300 may be determined, e.g., using the SPS receiver 317 (and/or by some other means) for a moment in time and measurements from the accelerometer(s) and gyroscope(s) taken after this moment in time may be used in dead reckoning to determine present location of the UE 300 based on movement (direction and distance) of the UE 300 relative to the reference location.

The magnetometer(s) may determine magnetic field strengths in different directions which may be used to determine orientation of the UE 300. For example, the orientation may be used to provide a digital compass for the UE 300. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions. The magnetometer may provide means for sensing a magnetic field and providing indications of the magnetic field, e.g., to the processor 310.

The barometric pressure sensors(s) may determine air pressure, which may be used to determine the elevation or current floor level in a building of the UE 300. For example, a differential pressure reading may be used to detect when the UE 300 has changed floor levels as well as the number of floors that have changed. The barometric pressure sensors(s) may provide means for sensing air pressure and providing indications of the air pressure, e.g., to the processor 310.

The transceiver 315 may include one or both of a wireless transceiver 340 or a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels and/or one or more sidelink channels) and/or receiving (e.g., on one or more downlink channels and/or one or more sidelink channels) wireless signals 348. In some implementations, the wireless signals 348 may be transduced to wired (e.g., electrical and/or optical) signals and from wired (e.g., electrical and/or optical) signals, and the wired signals may be transduced to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with candidate TRPs or TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 6GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. If the UE 300 is to include a wired transceiver, the wired transceiver 350 may include a transmitter 352 and a receiver 354 configured for wired communication. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication. The transceiver 315 may be communicatively coupled to the transceiver interface 314, e.g., by optical and/or electrical connection. The transceiver interface 314 may be at least partially integrated with the transceiver 315.

The antennas 346 may include an antenna array. The antenna array may be capable of transmit beamforming or receive beamforming, e.g., by increasing the gain setting and/or adjust the phase setting of an array of antennas in a particular direction to amplify (e.g., to increase the gain level of) the RF signals received from that direction. The antennas 346 may further include a plurality of antenna panels, wherein each antenna panel is capable of beamforming. The antennas 346 are capable of adaptation, e.g., selection of one or more antennas for controlling receiving transmitted beams from a base station. A reduced number of beams or a single beam, for example, may be selected for reception of a wide angle beam, e.g., to reduce power consumption, while an increased number of antennas in an antenna array may be selected when the transmit beam is relatively narrow.

The user interface 316 may include one or more of several devices such as, for example, a speaker, microphone, display device, vibration device, keyboard, touch screen, etc. The user interface 316 may include more than one of any of these devices. The user interface 316 may be configured to enable a user to interact with one or more applications hosted by the UE 300. For example, the user interface 316 may store indications of analog and/or digital signals in the memory 311 to be processed by DSP 331 and/or the processor 330 in response to action from a user. Similarly, applications hosted on the UE 300 may store indications of analog and/or digital signals in the memory 311 to present an output signal to a user. The user interface 316 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 316 may include one or more touch sensors responsive to touching and/or pressure, e.g., on a keyboard and/or touch screen of the user interface 316.

The SPS receiver 317 (e.g., a Global Positioning System (GPS) receiver or other Global Navigation Satellite System (GNSS) receiver) may be capable of receiving and acquiring SPS signals 360 via an SPS antenna 362. The antenna 362 is configured to transduce the wireless signals 360 to wired signals, e.g., electrical or optical signals, and may be integrated with the antenna 346. The SPS receiver 317 may be configured to process, in whole or in part, the acquired SPS signals 360 for estimating a location of the UE 300. For example, the SPS receiver 317 may be configured to determine location of the UE 300 by trilateration using the SPS signals 360. The processor 330, the memory 311, the DSP 331, the PD 319 and/or one or more additional specialized processors (not shown) may be utilized to process acquired SPS signals, in whole or in part, and/or to calculate an estimated location of the UE 300, in conjunction with the SPS receiver 317. The memory 311 may store indications (e.g., measurements) of the SPS signals 360 and/or other signals (e.g., signals acquired from the wireless transceiver 340) for use in performing positioning operations. The general-purpose processor 330, the DSP 331, the PD 319, and/or one or more additional specialized processors, and/or the memory 311 may provide or support a location engine for use in processing measurements to estimate a location of the UE 300. Also or alternative to using the SPS receiver 317 for positioning of the UE 300, the UE 300 may be configured for wireless positioning using signals transmitted and/or received via the wireless transceiver 340.

The UE 300 may include the camera 318 for capturing still or moving imagery. The camera 318 may include, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 330 and/or the DSP 331. Also or alternatively, the video processor 333 may perform conditioning, encoding, compression, and/or manipulation of signals representing captured images. The video processor 333 may decode/decompress stored image data for presentation on a display device (not shown), e.g., of the user interface 316.

The position device (PD) 319 may be configured to determine a position of the UE 300, motion of the UE 300, and/or relative position of the UE 300, and/or time. For example, the PD 319 may communicate with, and/or include some or all of, the SPS receiver 317 and the wireless transceiver 340. The PD 319 may work in conjunction with the processor 310 and the memory 311 as appropriate to perform at least a portion of one or more positioning methods, although the description herein may refer only to the PD 319 of the processor 310 being configured to perform, or performing, in accordance with the positioning method(s). The PD 319 may be configured to determine a location of the UE 300 using terrestrial-based signals (e.g., at least some of the signals 348) for trilateration for wireless positioning of the UE 300. Also or alternatively, the PD 319 may be configured to use one or more other techniques (e.g., relying on the UE's self-reported location (e.g., part of the UE's position beacon)) for determining the location of the UE 300, and may use a combination of techniques (e.g., SPS and terrestrial positioning signals) to determine the location of the UE 300. The PD 319 may include one or more of the sensors 313 (e.g., gyroscope(s), accelerometer(s), magnetometer(s), etc.) that may sense orientation and/or motion of the UE 300 and provide indications thereof that the processor 310 (e.g., the processor 330 and/or the DSP 331) may be configured to use to determine motion (e.g., a velocity vector and/or an acceleration vector) of the UE 300. The PD 319 may also be configured to provide indications of uncertainty and/or error in the determined position and/or motion. For example, the PD 319 may be configured to determine and indicate a GDOP for one or more groups of candidate TRPs from which PRSs are received.

The memory 311 may store software 312 that contains executable program code or software instructions that when executed by the processor 310 may cause the processor 310 to operate as a special purpose computer programmed to perform the functions disclosed herein. As illustrated, the memory 311 may include one or more components or modules that may be implemented by the processor 310 to perform the disclosed functions. While the components or modules are illustrated as software 312 in memory 311 that is executable by the processor 310, it should be understood that the components or modules may be stored in another computer readable medium or may be dedicated hardware either in the processor 310 or off the processor. A number of software modules and data tables may reside in the memory 311 and be utilized by the processor 310 in order to manage both communications and the functionality described herein. It should be appreciated that the organization of the contents of the memory 311 as shown is merely exemplary, and as such the functionality of the modules and/or data structures may be combined, separated, and/or be structured in different ways depending upon the implementation.

The memory 311, for example, may include a wireless positioning session module 372 that when implemented by the one or more processors 310 configures the one or more processors 310 to engage in a session to be used for determining one or more GDOPs, which may be used for determining one or more TRPs for wireless positioning of the UE 300, as described herein. For example, the one or more processors 310 (or the PD 319) may be configured to determine a first GDOP for a first combination of candidate TRPs based on the received PRSs from the first combination of candidate TRPs, a second GDOP for a second combination of candidate TRPs based on the received PRSs from the second combination of candidate TRPs, and so on. The GDOPs may be used by the UE 300 to determine one or more preferred candidate TRPs for wireless positioning, downselect the group of candidate TRPs for wireless positioning, and/or generate an indication associated with the GDOPs to be provided to a network entity (e.g., a gNB or a relay UE, which forwards the indication to a location server 172). In some implementations, the location server 172 may determine the final TRPs to be used for wireless positioning (which may be based on preferences from the UE, the group of candidate TRPs after downselection by the UE, and/or GDOPs indicated by the UE). While the wireless positioning session module 372 is depicted as being software included in memory 311, the wireless positioning session module 372 may be a hardware module, a software module, or a combination of hardware and software. For example, the module may include one or more application specific integrated circuits (ASICs), executable code, or a combination of both.

Figure 4:
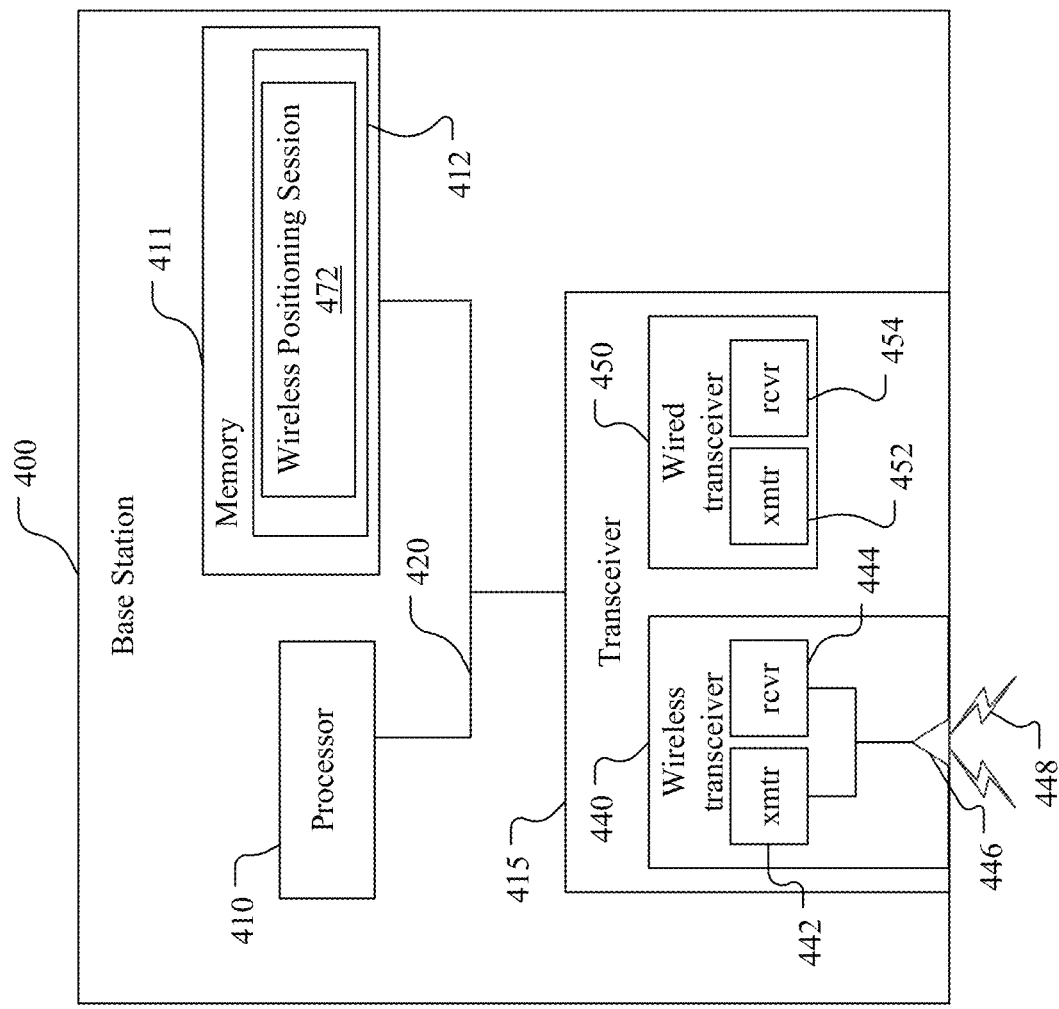
FIG. 4 illustrates a base station capable of supporting positioning services in a wireless network.

FIG. 4 illustrates a base station 400, which is an example of the base station 102, capable of supporting positioning services in a wireless network (such as wireless network 100). The base station 400 includes a computing platform including at least one processor 410, a memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus may be omitted from the base station 400, or the base station 400 may include one or more apparatus not shown. The processor 410 may include one or more intelligent hardware devices, e.g., a central processing unit (CPU), a microcontroller, an application specific integrated circuit (ASIC), etc. The processor 410 may include multiple processors (e.g., including one or more of an application processor, a DSP, a modem processor, a video processor, and/or a sensor processor, similar to that shown in FIG. 3). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to operate as a special purpose computer programmed to perform the various functions described herein. Alternatively, the software 412 may not be directly executable by the processor 410 but may be configured to cause the processor 410, e.g., when compiled and executed, to operate as a special purpose computer to perform the various functions described herein. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the base station 400 performing a function as shorthand for one or more appropriate components of the base station 400 performing the function. The processor 410 may include a memory with stored instructions in addition to and/or instead of the memory 411.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting and/or receiving (e.g., on one or more uplink channels and/or one or more downlink channels) wireless signals 448 and transducing signals from the wireless signals 448 to wired (e.g., electrical and/or optical) signals and from wired (e.g., electrical and/or optical) signals to the wireless signals 448. The antenna 446 is one or more antenna arrays capable of beam forming and transmitting and receiving beams, including beams used in transmitting or receiving signals (including PRSs) for positioning services. Also or alternatively, signals may be transmitted omnidirectionally. The transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 300, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 6GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., to send communications to, and receive communications from, the location server 172. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication. As used herein, an at least one transceiver of a base station 400 may refer to one or more of a wireless transceiver 440 or a wired transceiver 450.

The configuration of the base station 400 shown in FIG. 4 is an example and not limiting of the disclosure, including the claims, and other configurations may be used. For example, the description herein discusses that the base station 400 is configured to perform or performs several functions, but one or more of these functions may be performed by the location server 172 and/or the UE 300.

The memory 411 may store software 412 that contains executable program code or software instructions that when executed by the processor 410 may cause the processor 410 to operate as a special purpose computer programmed to perform the functions disclosed herein. As illustrated, the memory 411 may include one or more components or modules that may be implemented by the processor 410 to perform the disclosed functions. While the components or modules are illustrated as software 412 in memory 411 that is executable by the processor 410, it should be understood that the components or modules may be stored in another computer readable medium or may be dedicated hardware either in the processor 410 or off the processor. A number of software modules and data tables may reside in the memory 411 and be utilized by the processor 410 in order to manage both communications and the functionality described herein. It should be appreciated that the organization of the contents of the memory 411 as shown is merely exemplary, and as such the functionality of the modules and/or data structures may be combined, separated, and/or be structured in different ways depending upon the implementation.

The memory 411, for example, may include a wireless positioning session module 472 that when implemented by the processor 410 configures the processor 410 to assist in wireless positioning for one or more UEs in the wireless network. For example, the one or more processors 410 may configure the base station 400 to relay information between a location server 172 and UEs 104 in the wireless network, transmit one or more PRSs for wireless positioning, and/or transmit PRS assistance data to be used for wireless positioning. While the wireless positioning session module 472 is depicted as being software included in memory 411, the wireless positioning session module 472 may be a hardware module, a software module, or a combination of hardware and software. For example, the module may include one or more application specific integrated circuits (ASICs), executable code, or a combination of both.

Figure 5:
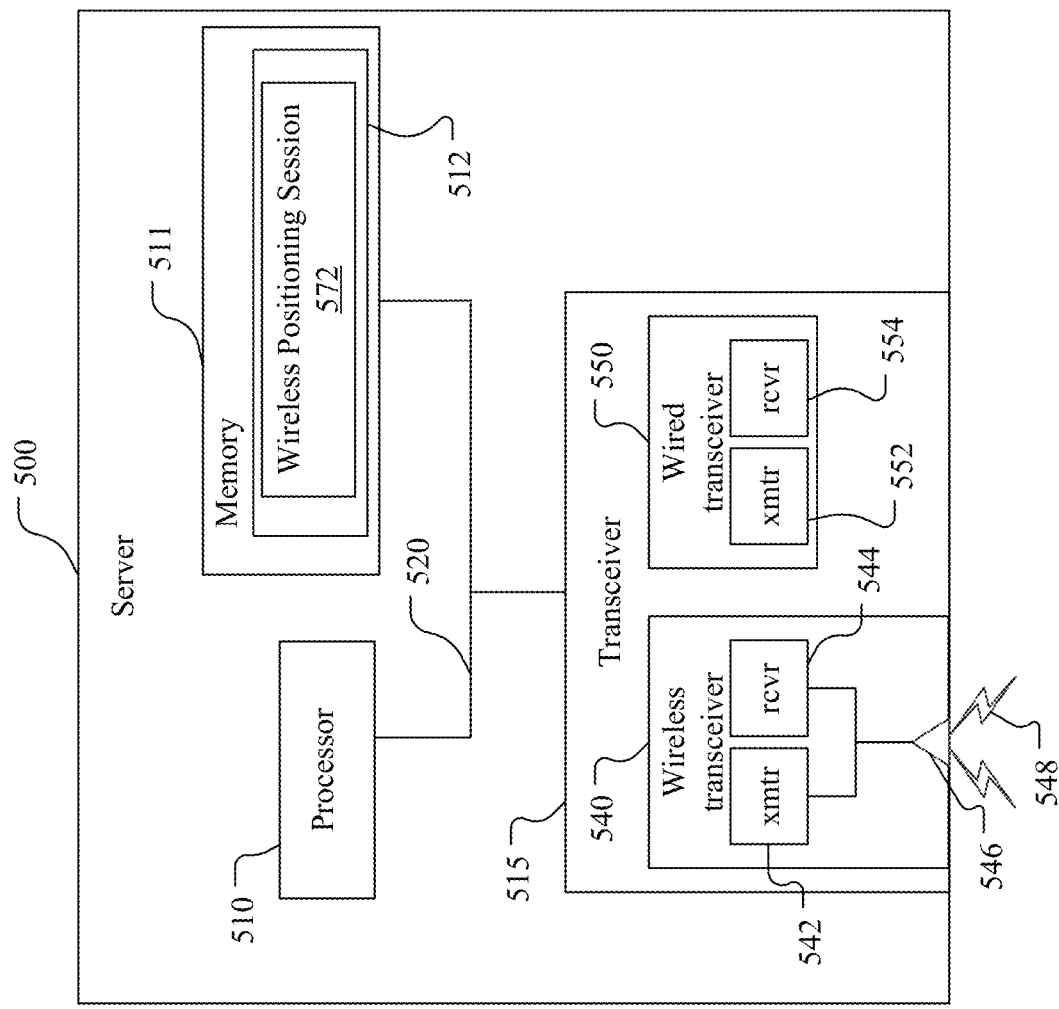
FIG. 5 illustrates a server capable of supporting positioning services in a wireless network.

FIG. 5 shows a server 500, which is an example of the location server 172 capable of supporting positioning services in a wireless network (such as wireless network 100). The server 500 includes a computing platform including at least one processor 510, memory 511 including software (SW) 512, and a transceiver 515. The processor 510, the memory 511, and the transceiver 515 may be communicatively coupled to each other by a bus 520 (which may be configured, e.g., for optical and/or electrical communication). One or more of the shown apparatus (e.g., a wireless interface) may be omitted from the server 500. The processor 510 may include one or more intelligent hardware devices, e.g., a central processing unit (CPU), a microcontroller, an application specific integrated circuit (ASIC), etc. The processor 510 may include multiple processors (e.g., including at least one of an application processor, a DSP, a modem processor, a video processor, and/or a sensor processor, similar to that shown in FIG. 3). The memory 511 is a non-transitory storage medium that may include random access memory (RAM)), flash memory, disc memory, and/or read-only memory (ROM), etc. The memory 511 stores the software 512 which may be processor-readable, processor-executable software code containing instructions that are configured to, when executed, cause the processor 510 to operate as a special purpose computer programmed to perform the various functions described herein. Alternatively, the software 512 may not be directly executable by the processor 510 but may be configured to cause the processor 510, e.g., when compiled and executed, to operate as a special purpose computer to perform the various functions described herein. The description may refer only to the processor 510 performing a function, but this includes other implementations such as where the processor 510 executes software and/or firmware. The description may refer to the processor 510 performing a function as shorthand for one or more of the processors contained in the processor 510 performing the function. The description may refer to the server 500 performing a function as shorthand for one or more appropriate components of the server 500 performing the function. The processor 510 may include a memory with stored instructions in addition to and/or instead of the memory 511.

The transceiver 515 may include one or both of a wireless transceiver 540 or a wired transceiver 550 configured to communicate with other devices through wireless connections and wired connections, respectively. For example, the wireless transceiver 540 may include a transmitter 542 and receiver 544 coupled to one or more antennas 546 for transmitting (e.g., on one or more downlink channels) and/or receiving (e.g., on one or more uplink channels) wireless signals 548 and transducing signals from the wireless signals 548 to wired (e.g., electrical and/or optical) signals and from wired (e.g., electrical and/or optical) signals to the wireless signals 548. Thus, the transmitter 542 may include multiple transmitters that may be discrete components or combined/integrated components, and/or the receiver 544 may include multiple receivers that may be discrete components or combined/integrated components. The wireless transceiver 540 may be configured to communicate signals (e.g., with the UE 300, one or more other UEs, one or more base stations 400, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 6GPP LTE-V2X (PC5), IEEE 802.11 (including IEEE 802.11p), WiFi, WiFi Direct (WiFi-D), Bluetooth®, Zigbee etc. The wired transceiver 550 may include a transmitter 552 and a receiver 554 configured for wired communication. The transmitter 552 may include multiple transmitters that may be discrete components or combined/integrated components, and/or the receiver 554 may include multiple receivers that may be discrete components or combined/integrated components. The wired transceiver 550 may be configured, e.g., for optical communication and/or electrical communication. As used herein, an at least one transceiver of a server 500 may refer to one or more of a wireless transceiver 540 or a wired transceiver 550.

The configuration of the server 500 shown in FIG. 5 is an example and not limiting of the disclosure, including the claims, and other configurations may be used. For example, the wireless transceiver 540 may be omitted. Also or alternatively, the description herein discusses that the server 500 is configured to perform or performs several functions, but one or more of these functions may be performed by a base station 400 and/or a UE 300.

The memory 511 may store software 512 that contains executable program code or software instructions that when executed by the processor 510 may cause the processor 510 to operate as a special purpose computer programmed to perform the functions disclosed herein. As illustrated, the memory 511 may include one or more components or modules that may be implemented by the processor 510 to perform the disclosed functions. While the components or modules are illustrated as software 512 in memory 511 that is executable by the processor 510, it should be understood that the components or modules may be stored in another computer readable medium or may be dedicated hardware either in the processor 510 or off the processor. A number of software modules and data tables may reside in the memory 511 and be utilized by the processor 510 in order to manage both communications and the functionality described herein. It should be appreciated that the organization of the contents of the memory 511 as shown is merely exemplary, and as such the functionality of the modules and/or data structures may be combined, separated, and/or be structured in different ways depending upon the implementation.

The memory 511, for example, may include a wireless positioning session module 572 that when implemented by the processor 510 configures the processor 510 to engage in supporting selection or downselection of one or more candidate TRPs for wireless positioning of one or more UEs in the wireless network, as discussed herein. While the wireless positioning session module 572 is depicted as being software included in memory 511, the wireless positioning session module 572 may be a hardware module, a software module, or a combination of hardware and software. For example, the module may include one or more application specific integrated circuits (ASICs), executable code, or a combination of both.

For wireless positioning, one or more anchors are used as TRPs to transmit and/or receive PRSs to/from a target UE. A distance between a TRP and the target UE may be based on an observed time difference of arrival (OTDOA) of one or more signals (referred to as OTDOA positioning) or any other suitable measurements used to determine distances for wireless positioning. OTDOA positioning is based on a multilateration method in which a UE conventionally measures the time of arrival (TOA) of specific reference RF signals (e.g., PRS, CRS, CSI-RS, etc.) transmitted by different pairs of network nodes (e.g., base stations 102, antennas of base stations 102, etc.). The TOA from several neighbors may be subtracted from a TOA from a reference node to determine the reference signal time differences (RSTDs) for the node pairs. As noted above, the time difference may be based on a reference signal (such as a PRS) being transmitted from an anchor to the UE. In some other implementations, a time difference may be based on a signal from the UE to an anchor or a round trip time (RTT) from the anchor back to the anchor or a neighboring device (with the UE relaying the PRS). RSTDs may be indicated to another device or otherwise used in determining a distance between an anchor and a UE. In some implementations, a target UE may measure a RSTD between instances of PRSs transmitted by other devices in the network. In some implementations, specific resources of a PRS may be used for measuring an RSTD. As used herein, a PRS resource may refer to any suitable portion or all of a PRS used for wireless positioning.

Figure 6:
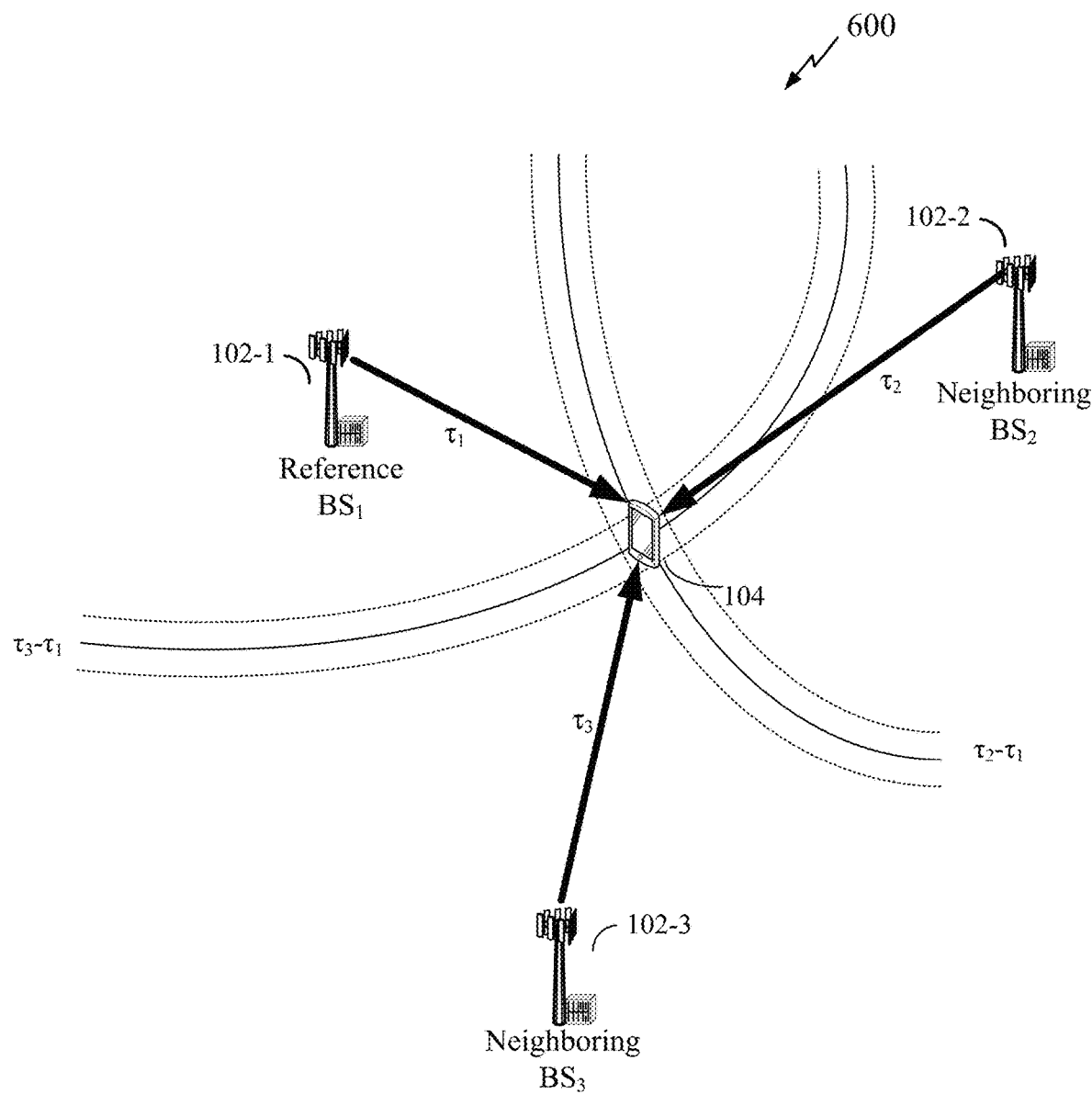
FIG. 6 is a diagram illustrating an exemplary technique for determining a position of a mobile device using information obtained from a plurality of base stations.

FIG. 6 illustrates an exemplary wireless communications system 600 implementing positioning using a Time Difference of Arrival (TDOA) technique. In the example of FIG. 6, a UE 104 determines an estimate of its position, or assists another entity (e.g., a base station or core network component, another UE, a location server, a third party application, etc.) to determine an estimate of its position. The UE 104 may communicate wirelessly with a plurality of base stations 102-1, 102-2, and 102-3 (collectively, base stations 102), which may correspond to any combination of base stations 102 in FIG. 1, using RF signals and standardized protocols for the modulation of the RF signals and the exchange of information packets. By extracting different types of information from the exchanged RF signals, and utilizing the layout of the wireless communications system 600 (i.e., the base stations' locations, geometry, etc.), the UE 104 may determine its position, or assist in the determination of its position, in a predefined reference coordinate system. In an aspect, the UE 104 may specify its position using a two-dimensional coordinate system; however, the aspects disclosed herein are not so limited, and may also be applicable to determining positions using a three-dimensional coordinate system if the extra dimension is desired. Additionally, while FIG. 6 illustrates one UE 104 and three base stations 102 (such as for 2D positioning), as will be appreciated, there may be more UEs 104 for positioning and more base stations 102 as candidate TRPs or anchors.

Generally, RSTDs are measured between a reference network node (such as a serving base station) and one or more neighbor network nodes. In the example illustrated in FIG. 6, base station 102-1 may be the serving base station for UE 104 (which may be the reference base station), while base stations 102-2 and 102-3 are neighboring base stations. The reference network node remains the same for all RSTDs measured by the UE 104 for any single positioning use of OTDOA and would typically correspond to the serving cell for the UE 104 or another nearby cell with good signal strength at the UE 104. In an aspect, where a measured network node is a cell supported by a base station, the neighbor network nodes would normally be cells supported by base stations different from the base station for the reference cell and may have good or poor signal strength at the UE 104. The RSTD may be the relative timing difference between two cells, e.g., the reference cell and the neighboring cell, which is determined based on the smallest time difference between two subframe boundaries from the two different cells.

The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server 172 may provide OTDOA assistance data to the UE 104 for the reference network node (e.g., base station 102-1 in the example of FIG. 6 or an anchor UE in another example) and the neighbor network nodes (e.g., base stations 102-2 and 102-3 in the example of FIG. 6 or one or more other anchors, which may include an anchor UE, in another example) relative to the reference network node. For example, the assistance data may provide the center channel frequency of each network node, various reference RF signal configuration parameters (e.g., the number of consecutive positioning subframes, periodicity of positioning subframes, muting sequence, frequency hopping sequence, reference RF signal ID, reference RF signal bandwidth), a network node global ID, and/or other cell related parameters applicable to OTDOA, as described above. The OTDOA assistance data may also indicate the serving cell for the UE 104 as the reference network node. For example, a UE 104 may obtain one or more NR-DL-PRS assistance data (NR-DL-PRS-AssistanceData) information elements (IEs) associated with the TRPs used for wireless positioning or the candidate TRPs from which the TRPs are selected for wireless positioning. The one or more NR-DL-PRS-AssistanceData IEs may include, for one or more pairs of TRP (or candidate TRP) PRS resources, an expected reference signal time difference (RSTD) value of a NR-DL-PRS (NR-DL-PRS-ExpectedRSTD) and an uncertainty value of the NR-DL-PRS-ExpectedRSTD (NR-DL-PRS-ExpectedRSTD-Uncertainty) associated with the pair of TRP (or candidate TRP) PRS resources. Different time durations associated with OTDOA positioning methods may be determined based on the expected RSTD and the uncertainty value.

In an aspect, while the location server 172 may send the assistance data to the UE 104 via one or more base stations 102 and/or relay UEs, alternatively, the assistance data can originate directly from base stations 102 themselves (e.g., in periodically broadcasted overhead messages, etc.). Alternatively, the UE 104 can detect and measure signals from neighbor network nodes itself without the use of assistance data.

In the example of FIG. 6, the measured time differences between the reference cell of base station 102-1 and the neighboring cells of base stations 102-2 and 102-3 are represented as $\tau_2-\tau_1$ and $\tau_3-\tau_1$, where $\tau_1$, $\tau_2$, and $\tau_3$ represent the transmission time of a reference RF signal from the transmitting antenna(s) of base station 102-1, 102-2, and 102-3, respectively, to the UE 104, and includes any measurement noise at the UE 104. The UE 104 may then convert the TOA measurements for different network nodes to RSTD measurements (e.g., as defined in 3GPP TS 36.214 entitled "Physical layer; Measurements"). Using (i) the RSTD measurements, (ii) the known absolute or relative transmission timing of each network node, (iii) the known position(s) of physical transmitting antennas for the reference and neighboring network nodes, (iv) directional reference RF signal characteristics such as a direction of transmission, and/or (v) assistance data associated with the TRPs or candidate TRPs, the UE's 104 position may be determined (either by the UE 104 or the location server 172).

For example, the TOA $T_i$ at the UE 104 for the shortest path from base station i is $$T_i = \tau_i + \frac{D_i}{c},$$

where $D_i$ is the Euclidean distance between the base stations i with location ($q_i$) and the UE 104 with location (p), c is the speed of light in the air (299700 km/s), and $q_i$ is known through a cell information database (which may be included in the location server or another network component). The Euclidean distance (i.e., the line distance between two points) is given by equation (1) below:

$$c(T_i-\tau_i)=\sqrt{2}R\sqrt{1-\sin(\varphi_1)\sin(\varphi_2)\cos(\varphi_1)\cos(\varphi_2)\cos(\beta_1-\beta_2)}, \quad (1)$$

where D is the distance between two points on the surface of the earth, R is the radius of the earth (6371 km), $\varphi_1$, $\varphi_2$ is the latitude (in radians) of the first point and the latitude (in radians) of the second point, respectively, and $\beta_1$, $\beta_2$ is the longitude (in radians) of the first point and the latitude (in radians) of the second point, respectively.

In order to identify the TOA of a reference RF signal transmitted by a given network node, the UE 104 first jointly processes all the resource elements (REs) on the channel on which that network node (e.g., base station 102) is transmitting the reference RF signal, and performs an inverse Fourier transform to convert the received RF signals to the time domain. The conversion of the received RF signals to the time domain is referred to as estimation of the Channel Energy Response (CER). The CER shows the peaks on the channel over time, and the earliest "significant" peak should therefore correspond to the TOA of the reference RF signal. Generally, a UE will use a noise-related quality threshold to filter out spurious local peaks, thereby presumably correctly identifying significant peaks on the channel. For example, a UE 104 may choose a TOA estimate that is the earliest local maximum of the CER that is at least X dB higher than the median of the CER and a maximum Y dB lower than the main peak on the channel. The UE 104 determines the CER for each reference RF signal from each network node in order to determine the TOA of each reference RF signal from the different network nodes.

The TOA measurements performed by the UE 104 are related to the geometric distance between the UE 104 and the TRP or candidate TRP (e.g., base station 102). In a 2D Cartesian coordinate system, the (known) coordinates of a base station may be denoted as $x_i=[x_i,y_i]^T$ and the (unknown) coordinates of the UE 104 may be denoted as $x_t=[x_t,y_t]^T$. The RSTD measurements may be defined as the time difference between two base stations (modulo 1-subframe (1-ms)), and therefore, correspond to the range differences between a neighbor base station 102-$i$ and the reference base station 102-1. A time difference between the neighboring base station 102-$i$ and reference base station 102-1 measured at the UE 104 is provided in equation (2) below:

$$RSTD_{i,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \quad (2)$$

($T_i-T_1$) is the transmit time offset between the base stations, referred to as a "Real Time Differences" (RTDs). Variables $n_i$ and $n_1$ are the UE TOA measurement errors. Constant c is the speed of light.

At least two neighbor base station measurements i (in addition to the reference base station) may be needed for wireless positioning. However, more than two neighbor base station measurements may be used or desirable (such as to increase the accuracy of the estimated position of the UE). The system of equations may be solved in the least-squares, or weighted-least-squares, sense. The transmit time offsets ($T_i-T_1$) should (ideally) be zero in a synchronized network, and the equation above defines the TDOA. Geometrically, each TDOA defines a hyperbola, where the width of the hyperbola is determined by the TDOA errors ($n_i-n_1$) (e.g., as shown in FIG. 6 corresponding to $\tau_3-\tau_1$ or $\tau_2-\tau_1$). If the base stations 102 coordinates and the transmit time offsets ($T_i-T_1$) are known at the location server 172 or at the UE 104, the position of the UE 104 may be determined.

Wireless positioning may be UE-assisted or UE-based. With UE-assisted positioning, a server 500 (such as location server 172) may determine a location/position of a target UE. While a location server 172 is described as performing the operations for clarity, one or more other network entities in the wireless network may perform all or a portion of the described operations (e.g., a base station, a core network component, etc.). The location server 172 may also determine the RS resources to be used for positioning (such as specific PRS formats, frequencies, time windows, whether transmission of PRSs is triggered or periodic, etc.). The location server 172 may also select which base stations 102 are to be used as TRPs for wireless positioning and settings for the TRP (such as which UEs are to be supported for wireless positioning). The location server 172 may indicate the determined resources to the base stations 102 (such as gNBs), which may indicate the resources to UEs 104 or use the indication to transmit PRSs. In some implementations, the location server 172 may exclude or select candidate TRPs to be used as TRPs for wireless positioning. The exclusion or selection may be based on a preference of candidate TRPs from one or more target UEs. Alternatively, exclusion or selection may be made independent of any preference from target UEs. As noted herein, exclusion or selection of candidate TRPs may be based on one or more GDOPs determined by one or more target UEs for different combinations of candidate TRPs for wireless positioning.

In wireless positioning, the geometry of the target UE and the TRPs impacts the accuracy or potential error in a location estimate for the target UE. For example, based on the resolution and timing of PRSs, a UE's location may be within a distance range from a TRP (such as shown by the $\tau_3-\tau_1$ or $\tau_2-\tau_1$ associated bands in FIG. 6). For multiple TRPs, the UE's location may be within an intersection of the distance ranges for the multiple TRPs. The intersection of ranges is a position uncertainty of the UE using multiple TRPs for wireless positioning. Adjusting the locations of the TRPs may adjust the shape and size of the position uncertainty, which may impact the accuracy in determining the UE's position.

Figure 7A:
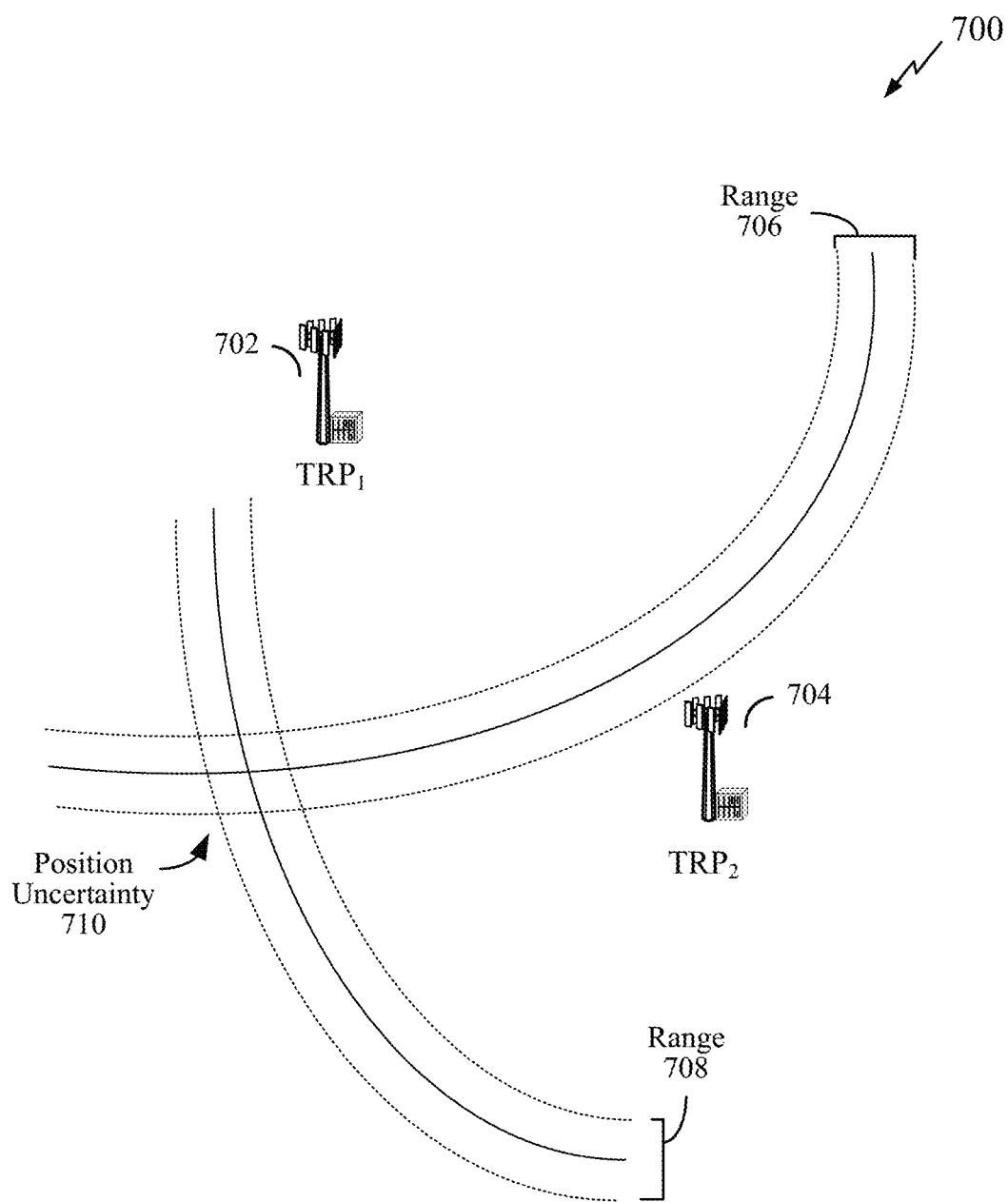
FIG. 7A is a diagram illustrating a first position uncertainty for a UE associated with a first and a second transmit-receive point (TRP) for wireless positioning.

FIG. 7A is a diagram 700 illustrating a position uncertainty 710 for a UE associated with a first TRP 702 and a second TRP 704 for wireless positioning. Based on the timing of PRSs and a resolution of the timing, a location of a UE may be determined to be within a range 706 for the TRP 702. Similarly, based on the timing of PRSs and a resolution of the timing, the location of the UE may be determined to be within a range 708 for the TRP 704. In this manner, the UE may be located within the intersection of the two ranges 706 and 708, indicated as the position uncertainty 710. The locations of the TRPs 702 and 704 impacts the dimensions and size of the position uncertainty 710. Also, while not shown, the number of TRPs to be used may impact the dimensions and size of the position uncertainty 710. For example, increasing the number of TRPs may reduce the size of the position uncertainty 710. While a 2D uncertainty is depicted in FIG. 7A (and FIG. 7B), the position uncertainty may be 3D for 3D positioning. In this manner, there may be an uncertainty in the elevation of the UE. While the examples and description are regarding 2D position uncertainty (such as position uncertainty 710) for clarity, the disclosure also applies to 3D position uncertainty.

Figure 7B:
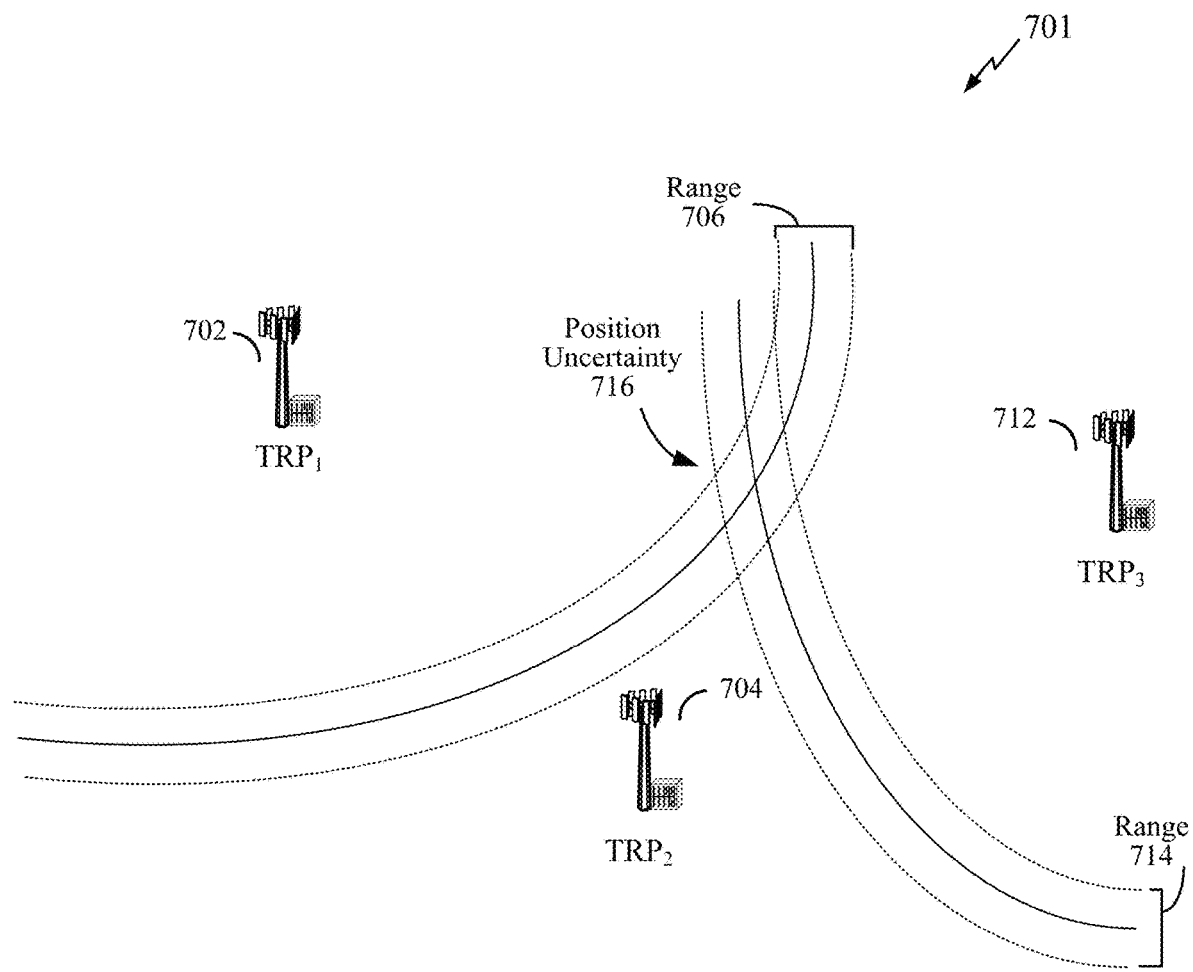
FIG. 7B is a diagram illustrating a second position uncertainty for the UE associated the first and a third TRP for wireless positioning.

FIG. 7B is a diagram 701 illustrating a position uncertainty 716 for the UE associated with the first TRP 702 and a third TRP 712 for wireless positioning. A location of a UE may be determined to be within a range 714 for the TRP 712. The locations of the second TRP 704 and the third TRP 712 differ from each other. As a result, the intersection between the range 706 and the range 714 may result in a different dimension position uncertainty than position uncertainty 710. As shown, the range 706 and the range 714 are associated with a position uncertainty 716. The size of the position uncertainty 716 is greater than the size of the position uncertainty 710, with the UE being located somewhere within the respective position uncertainty. As a result, a potential error in the location estimation for the UE is greater based on use of the base stations 702 and 712 as TRPs as compared to the use of the base stations 702 and 704 as TRPs. An intersection of ranges (such as position uncertainty 710 or 716) may be referred to herein as a GDOP.

As shown above with reference to FIGS. 7A and 7B, the location of the UE with reference to the locations of the TRPs for wireless positioning influences the potential error in a location estimation of the UE. For example, if the UE is in a middle area of an overlap of the base stations' (e.g., gNBs') coverage areas for wireless positioning, the GDOP may be smaller than if the UE is in an outer area of overlap of the base stations' (e.g., gNBs') coverage areas for wireless positioning. If the UE's location is known with reference to the candidate TRPs, specific candidate TRPs may be selected as the TRPs for wireless positioning to reduce the GDOP associated with a location estimation of the UE. However, the location of the UE is to be determined using selected TRPs for wireless positioning, and the UE's location may not be known before selecting the TRPs to be used for wireless positioning. A UE may determine its location using non-RAT means. For example, the UE may determine its location using trilateration of GNSS signals. In this manner, the UE's location may be known for selecting the candidate TRPs. However, many devices may be unable to determine its location using non-RAT means (such as devices without a GNSS or GPS receiver), or a user may have privacy concerns about providing his or her exact location. In some implementations, a UE may determine GDOPs for different combinations of candidate TRPs, and the GDOPs may be used in determining the candidate TRPs to be used for wireless positioning of the UE. In this manner, non-RAT means for determining a location is not required, and providing an exact location of the UE to a network component (such as a location server 172) is not required to perform wireless positioning.

The GDOP may be calculated in any suitable manner based on the type of positioning method used (such as TOA based positioning). For example, the GDOP may be the ratio of the standard deviation ($\sigma$) of errors (such as $n_1-n_i$ described above with reference to equation (1)) in the least squares solution (e.g., the square root of the sum of the squared standard deviation of error along the x axis and the squared standard deviation of error along the y axis) to the standard deviation of the measurement errors (e.g., across the Cartesian coordinate system). An example means for calculating a GDOP is provided in equation (3) below:

$$GDOP = \frac{\sqrt{\sigma_x^2 + \sigma_y^2}}{\sigma_{meas}} \quad (3)$$

where $\sigma_{meas}^2$ is the measurement error variance. In equation (3), $\sigma_x^2 + \sigma_y^2$ may be represented as a trace of the inverse of a gram-determinant matrix, as provided in equation (4) below:

$$GDOP = \frac{\sqrt{\text{trace}\{(G^T G)^{-1}\}}}{\sigma_{meas}} \quad (4)$$

Matrix G may be determined using any known methods. For example, for a TOA based positioning method, matrix G based on three TRPs (such as for 2D positioning) may be determined as provided in equation (5) below:

$$G = \begin{bmatrix} \frac{(x-x_1)}{\sqrt{(x-x_1)^2+(y-y_1)^2}} & \frac{(y-y_1)}{\sqrt{(x-x_1)^2+(y-y_1)^2}} \\ \frac{(x-x_2)}{\sqrt{(x-x_2)^2+(y-y_2)^2}} & \frac{(y-y_2)}{\sqrt{(x-x_2)^2+(y-y_2)^2}} \\ \frac{(x-x_3)}{\sqrt{(x-x_3)^2+(y-y_3)^2}} & \frac{(x-x_3)}{\sqrt{(x-x_3)^2+(y-y_3)^2}} \end{bmatrix} \quad (5)$$

where (x,y) are the coordinates determined for the UE based on the three TRPs and $(x_i, y_i)$ are the coordinates for each TRP. Equation (5) may be extended to any number of TRPs N for 2D positioning (or for 3D positioning), with the number of rows in matrix G equaling N and/or the number of columns in matrix G equaling the number of dimensions. For TOA based positioning, a GDOP may be determined based on equations (4) and (5) (which may be extended to any number of TRPs or to 3D positioning) for any combination of base stations that may act as TRPs within range of a UE. While one example for determining a GDOP is provided above, a device may use any suitable means for determining a GDOP.

As depicted above in equations (3) and (4), a GDOP may be a value determined for a combination of base stations from which PRSs are obtained, and the value may indicate the size of the position uncertainty associated with the combination of base stations in determining a location of a UE. In this manner, a smaller GDOP may indicate a smaller position uncertainty, which may indicate a smaller potential error for the location estimation of a UE. Different combinations of candidate TRPs may be compared to one another for suitability as being TRPs for wireless positioning based on the GDOPs associated with each combination. For example, a UE may determine a first GDOP for a first combination of candidate TRPs, and the UE may determine a second GDOP for a second combination of candidate TRPs. To note, different combinations or subsets of candidate TRPs from a plurality of TRPs may overlap by one or more candidate TRPs or may be mutually exclusive of each other. Also or alternatively, the number of candidate TRPs in a group or combination may be adjustable. In this manner, a first group of candidate TRPs may have more, less, or the same number of candidate TRPs as a second group of candidate TRPs from a plurality of candidate TRPs. A smaller GDOP may indicate which group of candidate TRPs would result in a more accurate location estimate of the UE.

For UE-assisted positioning (in which a location server 172 may determine a location of the UE), the UE may downselect the group of candidate TRPs before a location server 172 determines the final TRPs to be used for wireless positioning. For example, the UE may indicate one or more preferred TRPs or may indicate one or more TRPs to be excluded from use for wireless positioning of the UE. Also or alternatively, the UE may indicate the GDOPs, and the location server 172 may determine the candidate TRPs to be used for wireless positioning based on the GDOPs determined by the UE for different groups of candidate TRPs. For UE-based positioning (in which the UE determines its position), the UE may determine the TRPs to be used for wireless positioning. The UE may indicate which TRPs are selected so that TRPs may be pruned to remove any unselected TRPs (such as by configuring an unselected base station to not transmit PRSs or otherwise muting the PRSs from the unselected base station). In some implementations, the location server 172 may still indicate the final TRPs based on the overall TRPs to be used for wireless positioning of multiple UEs in the wireless network 100. In some implementations, a candidate TRP that is excluded from wireless positioning for a UE may still support wireless positioning for one or more other UEs in the wireless network 100. In this manner, a first TRP may support wireless positioning for a first subset of UEs while a second TRP may support wireless positioning for a second subset of UEs in the wireless network.

Use of GDOP in selecting or excluding candidate TRPs may also allow reduction of the number of TRPs used for wireless positioning. For example, if a combination of four candidate TRPs yields a GDOP similar to (such as within a threshold amount of) a combination of five candidate TRPs, four candidate TRPs may be used for wireless positioning instead of five. Assuming the fifth candidate TRP is not to be used for wireless positioning of other UEs in the wireless network 100, fewer base stations 102 may be required to transmit PRSs or perform other wireless positioning operations, and the UE may be required to sense fewer PRSs from fewer TRPs for determining a location of the UE (or other UEs), which may save processing resources in the wireless network and the UE itself.

Figure 8:
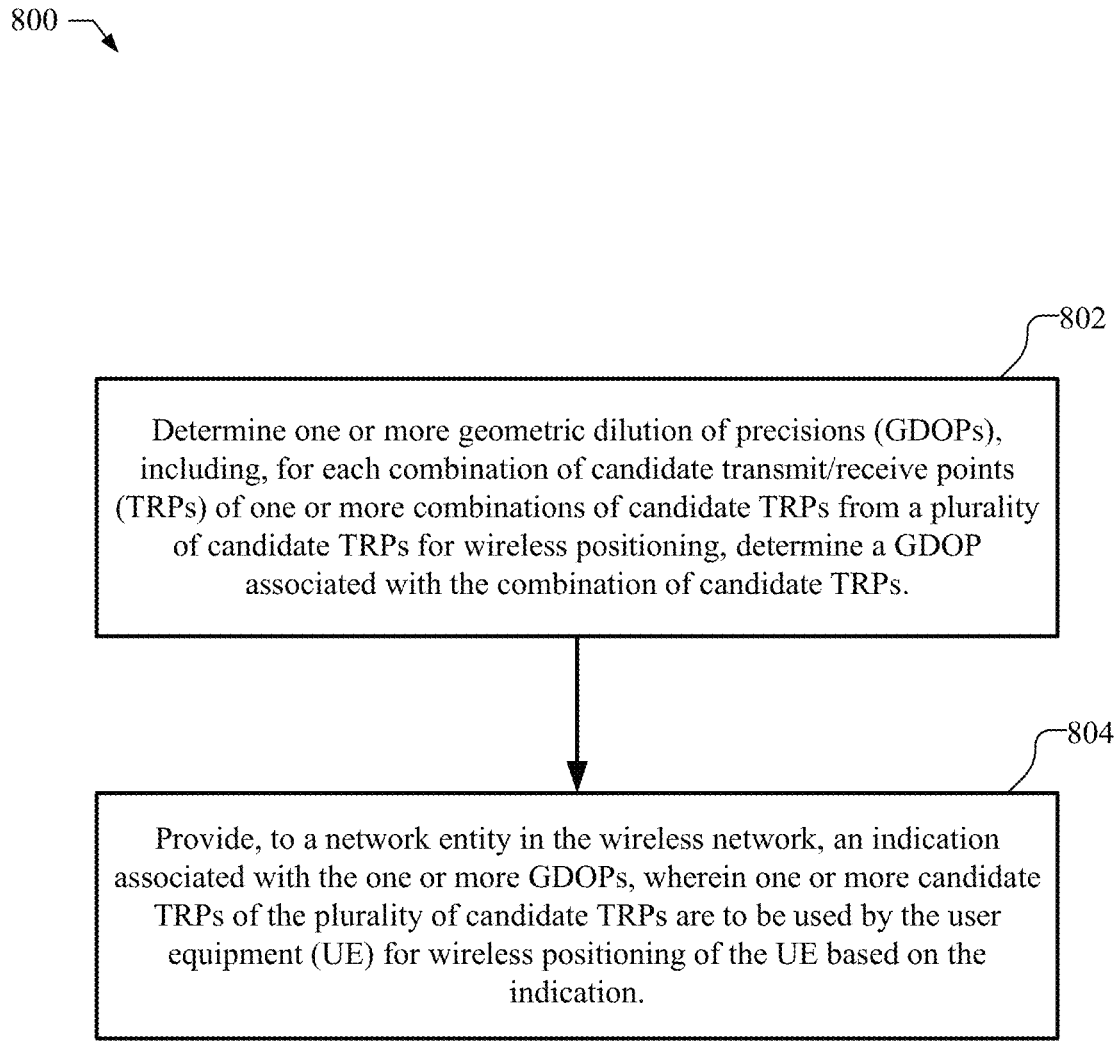
FIG. 8 shows a flowchart for an exemplary method for wireless positioning of a UE in a wireless network.

FIG. 8 shows a flowchart for an exemplary method 800 for wireless positioning of a UE in a wireless network. The exemplary method 800 may be performed by a UE of a wireless network for which wireless positioning is to be performed, such as a UE 104 shown in FIG. 1 or UE 300 shown in FIG. 3, in a manner consistent with disclosed implementations. While a UE is described as performing the method 800 herein, any other suitable devices or components may perform one or more operations of the method 800. A device that may perform one or more operations in method 800 (or any of the other described methods, such as method 900 in FIG. 9) may include at least one transceiver (such as one or more wireless transceivers and/or one or more wired transceivers), at least one memory, and at least one processor coupled to the at least one transceiver and the at least one memory. Referring to the UE 300 as an example device, the at least one transceiver may include the transceiver 315 or the wireless transceiver 340, the at least one memory may include the memory 311, and the at least one processor may include one or more of the processor 310, one or more of processors 330-334, or the position device 319. Referring to the base station 400 as an example device, the at least one transceiver may include all or a portion of the transceiver 415, the at least one memory may include the memory 411, and the at least one processor may include the processor 410. Referring to the server 500 (e.g., a location server) as an example device, the at least one transceiver may include all or a portion of the transceiver 515, the at least one memory may include the memory 511, and the at least one processor may include the processor 510.

At block 802, the UE determines one or more GDOPs. Determining the one or more GDOPs includes, for each combination of candidate TRPs of one or more combinations of candidate TRPs from a plurality of candidate TRPs for wireless positioning, a GDOP associated with the combination of candidate TRPs. Means for determining one or more GDOPs may include the at least one processor of the UE. In some implementations, at least one processor of the UE is configured to determine the GDOP for each combination of candidate TRPs. For example, one or more of the processors 330-334 or the position device 319 (or any other suitable component) of the UE 300 may determine the GDOPs.

To determine the one or more GDOPs, the UE may select a first combination of candidate TRPs from the plurality of candidate TRPs within range of the UE, and the UE may determine a first GDOP for the first combination of candidate TRPs. The UE may select a second combination of candidate TRPs from the plurality of candidate TRPs within range of the UE, and the UE may determine a second GDOP for the second combination of candidate TRPs. The UE may select any number of combinations of candidate TRPs. The number of candidate TRPs may be any number (such as three or more candidate TRPs for 2D positioning or four or more candidate TRPs for 3D positioning). In some implementations, the UE may determine the number of candidate TRPs in a combination (such as up to a maximum number of candidate TRPs) to balance processing resources needed for wireless positioning to an accuracy associated with any estimated location using the combination of candidate TRPs for wireless positioning. Determining the GDOP for a selected combination of candidate TRPs may be performed in any suitable manner (such as described above for TOA based positioning methods).

Selection of the different combinations of candidate TRPs may be performed in any suitable manner. In one example, the UE determines a predefined number of combinations. In another example, the UE determines an additional combination of candidate TRPs when none of the existing combinations are associated with a GDOP less than a GDOP threshold. In another example, the UE determines combinations of candidate TRPs and associated GDOPs for a defined amount of time. In another example, the UE determines a motion state of the UE (such as determining a velocity or displacement of the UE based on one or more IMU measurements), and the UE may adjust the number of combinations to be determined based on the motion of the UE. For example, if the UE is moving, selection of different candidate TRPs may occur more frequently as a result of the moving UE. Since the combination of TRPs may be adjusted (e.g., the TRPs to be used for wireless positioning of the UE being reselected) more frequently as a result of the UE's movement through the wireless network, the UE may reduce the number of combinations to reduce processing resources at the moment. If the motion state of the UE drops below a threshold (such as the displacement or velocity of the UE dropping below the threshold), the UE may increase the number of combinations to be determined to attempt to increase the accuracy of location estimation for the UE. In one example, the UE may use any combination of one or more instances of the above examples in selecting the combinations of candidate TRPs for determining a GDOP.

Also or alternative to determining the number of combinations to be selected, the UE may determine the number of candidate TRPs to be included in each combination. In this manner, the number of candidate TRPs to be included in a combination of candidate TRPs is adjustable. For example, the UE may limit the number of candidate TRPs in a combination to a defined maximum number of candidate TRPs. The UE may determine any number of combinations associated with the allowed number of candidate TRPs (such as described above). In some implementations, the number of candidate TRPs to be included in a combination is based on a motion state of the UE. For example, the number of candidate TRPs per combination may be decreased as the velocity or speed of the UE increases. Also or alternative to the above examples, any other suitable operations for adjusting the number of candidate TRPs per combination may be performed.

For each combination of candidate TRPs determined by the UE, the UE determines a GDOP for the combination of candidate TRPs. Estimating/determining a GDOP may be performed in any suitable manner. For example, the UE may use any conventional statistical method to estimate a GDOP (such as described above with reference to TOA based positioning methods). Also or alternatively, the UE may use one or more machine learning models to estimate the GDOP. For example, inputs to the one or more machine learning models may include expected RSTDs included in the assistance data, determined RSTDs from PRSs obtained from candidate TRPs, or other information obtained from another device in the wireless network or determined by the UE. In some implementations, a comparison of the expected RSTDs to the determined RSTDs may be used as training data to train the machine learning models to estimate GDOPs. In some implementations, a GDOP determined after selecting the TRPs may be compared with a GDOP determined before selection, and results of the comparison may be provided as feedback in training the machine learning models. The locations of the base stations are known and may be used to determine known GDOPs associated with different subsets of the base stations. In some implementations, the machine learning models may be trained in a controlled environment (with training being supervised or unsupervised), and the trained models may be deployed in UEs 104 in the wireless network 100 to estimate a GDOP for the combinations of candidate TRPs.

At block 804, the UE provides, to a network entity in the wireless network, an indication associated with the one or more GDOPs, wherein one or more candidate TRPs of the plurality of candidate TRPs are to be used by the UE for wireless positioning of the UE based on the indication. Means for providing the indication may include at least one transceiver of the UE. For example, the UE, via the at least one transceiver, may provide a report (which may be any suitable packet or data frame) to the network entity including the indication. In some implementations, a wireless transceiver is configured to provide the indication to a network entity in the wireless network. For example, the wireless transceiver 340 of the UE 300 may be configured to provide the indication to a base station (e.g., a gNB) serving the UE 300. In another example, the wireless transceiver 340 of the UE 300 may be configured to provide the indication to a relay UE between the base station and the UE 300. The indication may be provided through the wireless network 100, including through the core network 170, to the location server 172. The indication may be used by the location server 172 in determining the one or more candidate TRPs to be used by the UE for wireless positioning of the UE. Alternatively, the indication may indicate the one or more candidate TRPs to be used by the UE (with the UE possibly selecting the one or more candidate TRPs based on the one or more GDOPs). The location server 172 may determine the settings for the selected TRPs and the UE to support wireless positioning, and the settings may be provided to the selected TRPs and the UE. While not shown, the location server 172 may determine one or more candidate TRPs not to be used for wireless positioning of the UE based on the indication, and/or the location server 172 may determine the settings to be used to remove an unselected candidate TRP from being used for wireless positioning of the UE (which may include muting PRSs from the unselected TRP or otherwise configuring the unselected TRP from supporting wireless positioning of the UE).

In some implementations, the indication from the UE to a network entity includes the one or more GDOPs determined by the UE. In this manner, a UE 104 may determine one or more GDOPs (as described above), and the UE 104 may indicate the one or more GDOPs to a location server 172 (such as via a report to a base station or a relay UE of the wireless network 100). As noted above, the indication may be included in any suitable report to a base station or a relay UE between the base station and the UE, and the base station may provide the indication towards the location server 172 (such as through a core network 170). The indication may also indicate the combination of candidate TRPs associated with each GDOP. In this manner, the location server 172 may determine the combination of candidate TRPs associated with a GDOP from the indication.

In some implementations, the indication may include the candidate TRPs selected by the UE for wireless positioning. In this manner, the UE may exclusively determine the candidate TRPs to be used for wireless positioning and indicate the selection to the wireless network 100. The location server 172 may obtain the indication of the selection and configure the selected TRPs for wireless positioning and indicate the configurations to the wireless network 100 (such as to a base station to provide the configurations to the UE for wireless positioning). In some implementations, based on the selection by the UE (and/or selections by other UEs in the wireless network), the location server 172 may prune the TRPs to be used for wireless positioning to those indicated by the one or more UEs in the wireless network 100.

Alternative to the UE selecting the candidate TRPs to be used for wireless positioning, the location server 172 may select one or more candidate TRPs for wireless positioning of the UE. In some implementations, the indication includes all of the GDOPs determined by the UE. For example, if the UE selects five combinations of candidate TRPs and determines five GDOPs, the UE may include the five GDOPs in the report to the base station. The location server 172 may select one or more candidate TRPs to be used for wireless positioning of the UE based on the obtained GDOPs. In some other implementations, the indication includes only a subset of the GDOPs determined by the UE (with the location server 172 to select one or more candidate TRPs to be used for wireless positioning based on the obtained GDOPs). For example, the UE may determine a plurality of combinations of candidate TRPs (with the plurality of combinations including the one or more combinations of candidate TRPs), and the UE may determine a GDOP for each of the plurality of combinations. The one or more GDOPs to be included in the indication may be selected by the UE based on a GDOP threshold.

For example, the UE may indicate one or more combinations of candidate TRPs that are to be included or considered for selection as TRPs for wireless positioning. The combinations of candidate TRPs to be considered may be associated with GDOPs less than a GDOP threshold. As noted above, the GDOP may be associated with an accuracy of a location estimate of the UE, with a smaller GDOP corresponding to a smaller potential error of the location estimate. In this manner, any GDOPs greater than the GDOP threshold may be excluded from the indication. In excluding a GDOP, the combination of candidate TRPs associated with the excluded GDOP may be excluded from consideration as the combination of TRPs to be used for wireless positioning of the UE.

In another example, the UE may indicate one or more candidate TRPs that are to be excluded from being used for wireless positioning of the UE (such as from being excluded from selection by the location server). The candidate TRPs to be excluded may be associated with GDOPs greater than a GDOP threshold. As noted above, the GDOP may be associated with an accuracy of a location estimate of the UE, with a larger GDOP corresponding to a larger potential error of the location estimate. In this manner, any GDOPs less than the GDOP threshold may be excluded from the indication. The location server 172 may exclude from consideration a combination of candidate TRPs associated with an included GDOP in the indication, and the location server 172 may select the TRPs for wireless communication from any remaining combinations. In excluding a GDOP from being reported by the UE to the location server 172, the combination of candidate TRPs associated with the excluded GDOP may remain for consideration for wireless positioning of the UE. By reducing the number of GDOPs to be reported to the GDOPs associated with combinations of candidate TRPs to be excluded or included for consideration in determining the final TRPs, the UE may reduce signaling overhead in indicating the GDOPs to the network entity (which forwards the indication to the location server 172).

In some implementations, the indication associated with the one or more GDOPs includes an indication of one or more preferred TRPs for wireless positioning. In this manner, the location server 172 may select one or more TRPs for wireless positioning of the UE based on the one or more preferred TRPs indicated by the UE.

Figure 9:
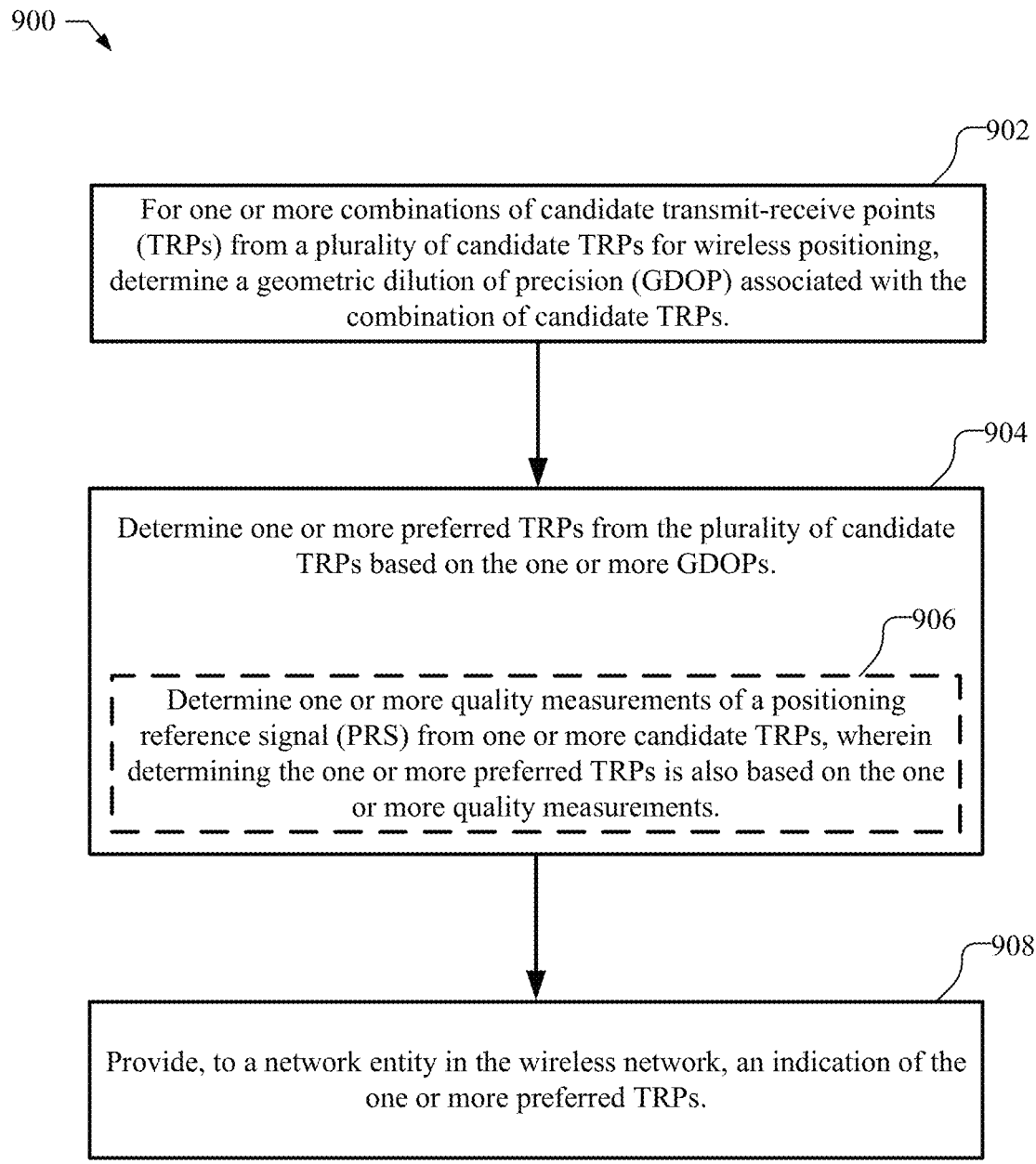
FIG. 9 shows a flowchart for an exemplary method for wireless positioning of a UE in a wireless network.

FIG. 9 shows a flowchart for an exemplary method 900 for wireless positioning of a UE in a wireless network. The method 900 may be an example implementation of the method 800 in FIG. 8, with selection of one or more TRPs for wireless positioning based on an indication of one or more preferred TRPs from the UE (and, optionally, information from other UEs in the wireless network). The exemplary method 900 may be performed by a UE of a wireless network for which wireless positioning is to be performed, such as a UE 104 shown in FIG. 1 or UE 300 shown in FIG. 3, in a manner consistent with disclosed implementations. While a UE is described as performing the method 900 herein, any other suitable devices or components may perform one or more operations of the method 900. A device that may perform one or more operations in method 900 may include at least one transceiver (such as one or more wireless transceivers and/or one or more wired transceivers), at least one memory, and at least one processor coupled to the at least one transceiver and the at least one memory. Referring to the UE 300 as an example device, the at least one transceiver may include the transceiver 315 or the wireless transceiver 340, the at least one memory may include the memory 311, and the at least one processor may include one or more of the processor 310, one or more of processors 330-334, or the position device 319. Referring to the base station 400 as an example device, the at least one transceiver may include all or a portion of the transceiver 415, the at least one memory may include the memory 411, and the at least one processor may include the processor 410. Referring to the server 500 (e.g., a location server) as an example device, the at least one transceiver may include all or a portion of the transceiver 515, the at least one memory may include the memory 511, and the at least one processor may include the processor 510.

At block 902, the UE determines, for one or more combinations of candidate TRPs, a GDOP associated with the combination of candidate TRPs. Means for determining one or more GDOPs may include the at least one processor of the UE. The one or more operations of block 902 may be the same as for block 802 in method 800 described above.

At block 904, the UE determines one or more preferred TRPs from the plurality of candidate TRPs based on the one or more GDOPs. Means for determining one or more preferred TRPs may include the at least one processor of the UE. In some implementations, the UE may indicate one or more preferred combinations of candidate TRPs based on the determined GDOPs. For example, the UE may indicate one or more combinations associated with a GDOP less than a GDOP threshold. In another example, the UE may indicate the combination associated with the lowest GDOP across all determined GDOPs. The indication may indicate the preferred TRPs as a combination of candidate TRPs associated with a GDOP, or the indication may indicate the preferred TRPs as a list of TRPs that may not be associated with the specific combinations of candidate TRPs.

In addition to determining the one or more preferred TRPs based on the one or more GDOPs, the UE may determine the one or more preferred TRPs based on one or more quality measurements of a PRS from one or more candidate TRPs. For example, at block 906, the UE may optionally determine one or more quality measurements of a PRS from one or more candidate TRPs, wherein determining the one or more preferred TRPs is also based on the one or more quality measurements. Means for determining one or more quality measurements of a PRS from one or more candidate TRPs may include the at least one processor and/or the at least one transceiver of the UE (which may be referred to collectively as the at least one processor of the UE). An example quality measurement may include one or more of a reference signal receive power (RSRP) of the PRS received at the UE or a signal to noise ratio (SNR) of the PRS received at the UE. Also or alternatively, other quality measurements may be used, such as a signal to interference plus noise ratio (SINR) of the PRS, a reference signal receive quality (RSRQ) associated with the RSRP of the PRS and the noise, a Doppler shift or Doppler spread associated with the PRS, or other suitable quality measurements. While quality measurements of a PRS are described, quality measurements of any suitable signal from a candidate TRP may be determined and used, such as other reference signals or data signals from the candidate TRP.

The quality measurement may indicate if the UE may have difficulty in successfully decoding a PRS from the candidate TRP. For example, if the RSRP is below an RSRP threshold or the SNR is below an SNR threshold associated with a signal threshold level below which inaccuracies may occur in obtaining and/or decoding the PRS, the associated candidate TRP may be a poor candidate for wireless positioning of the UE. In some implementations, the UE may determine one or more quality metrics (such as an RSRP and/or an SNR of the PRS) associated with a candidate TRP, compare the one or more quality metrics to one or more thresholds (such as the determined RSRP to an RSRP threshold and/or the determined SNR to an SNR threshold), and exclude the candidate TRP from being selected for wireless positioning of the UE based on the comparison (such as the determined RSRP being less than the RSRP threshold or the determined SNR being less than the SNR threshold).

In some implementations, the UE may downselect the group of candidate TRPs (such as exclude candidate TRPs) in a two-step process. A first step may include downselecting the plurality of candidate TRPs based on the one or more GDOPs (such as based on comparing a GDOP to a GDOP threshold). For example, if a candidate TRP is in a combination of candidate TRPs associated with a GDOP less than the GDOP threshold, the UE may exclude the candidate TRP from consideration. In another example, the specific combination of candidate TRPs associated with the GDOP less than the GDOP threshold may be excluded from consideration (but a candidate TRP may still be included in a different combination that may be selected for wireless positioning).

After downselecting the plurality of candidate TRPs based on the one or more GDOPs, the second step of downselecting the plurality of candidate TRPs may include the UE downselecting the plurality of candidate TRPs (already downselected in the first step) based on the one or more quality measurements. For example, if a RSRP of a PRS from a candidate TRP (still in the plurality of candidate TRPs) is less than an RSRP threshold, the candidate TRP may be excluded from consideration. As used herein, downselecting may refer to filtering or excluding one or more objects from a group. For example, downselecting a plurality of candidate TRPs may refer to excluding one or more candidate TRPs of the plurality of candidate TRPs from being used for wireless positioning of the UE.

At block 908, the UE provides, to a network entity in the wireless network, an indication of the one or more preferred TRPs. Means for providing the indication may include at least one transceiver of the UE. In some implementations, the indication of the one or more preferred TRPs may include an indication of the TRPs excluded based on the GDOPs and/or the quality measurements. In some other implementations, the indication of the one or more preferred TRPs may include an indication of the remaining candidate TRPs after downselection by the UE.

While not shown, the location server 172 may obtain the indication and select the TRPs to be used for wireless positioning of the UE based on the indication. Referring back to FIG. 1, multiple UEs 104 may exist in a wireless network 100, and the wireless network 100 may be configured to support wireless positioning for a plurality of the UEs 104. In this manner, the location server 172 may determine TRPs to be used for wireless positioning of not only one UE 104 (such as the UE referred to in FIGS. 8 and 9 above), but for a plurality of UEs 104. In this manner, a selected TRP may be used for wireless positioning of more than one UE 104 in the wireless network. The other UEs 104 may indicate preferred TRPs for wireless positioning, and selection of the one or more of the plurality of candidate TRPs for wireless positioning of the UE may also be based on one or more indications of preferred TRPs from one or more other UEs 104 in the wireless network 100.

In some implementations, preferred combinations of TRPs may be obtained from multiple UEs at the location server 172. The location server 172 may determine, from the preferred combinations of TRPs, a smallest subset of TRPs to be used for wireless positioning of all of the intended UEs 104 in the wireless network 100. Also or alternatively, the location server 172 may determine a combination of TRPs that may not be the most preferred combination of TRPs for a specific UE but that may be a suitable combination of TRPs for multiple UEs. Any other suitable manner in determining the final TRPs to be used for wireless positioning may be performed, as the above examples are provided for clarity in describing aspects of the present disclosure.

Alternative or in addition to using one or more quality measurements in determining one or more preferred TRPs, determining the one or more preferred TRPs may be based on a power saving of the UE. For example, a PRS may be transmitted at a dedicated time from a candidate TRP, which may be determined by the location server 172. If one or more candidate TRPs are excluded from wireless positioning for the UE, the UE may place one or more radio frequency (RF) chains of the UE into a low power mode during a time when the excluded TRPs are to transmit PRSs. For example, the UE 300 may reduce or remove power to one or more components of the wireless transceiver 340. In some implementations, all RF chains may be placed into a low power mode. Also or alternative, the UE 300 may reduce or remove power to a baseband processing system (which may include one or more UE components configured for baseband processing) during the time when the excluded TRPs transmit PRSs. Conversely, the UE may place the one or more RF chains (and/or the baseband processing system) into an active mode during a time associated with the remaining TRPs to transmit PRSs. For example, the modem processor 332 or other components (such as one or more components of the transceiver 315) of the UE 300 may be included in or may be configured to implement the baseband processing system.

Selecting TRPs with times associated with transmitting PRSs close to one another in time may reduce the amount of time that one or more RF chains (and a baseband processing system) are to remain in an active mode to obtain and process PRSs from the selected TRPs. Conversely, if the times are more spread out from one another, the amount of time that one or more RF chains (and a baseband processing system) are to remain in an active mode to obtain and process PRSs from the selected TRPs may increase. In some implementations, the UE may determine to preferred TRPs also based on a time duration associated with when PRSs (or other suitable signals for wireless positioning) are transmitted by the preferred TRPs.

Figure 10:
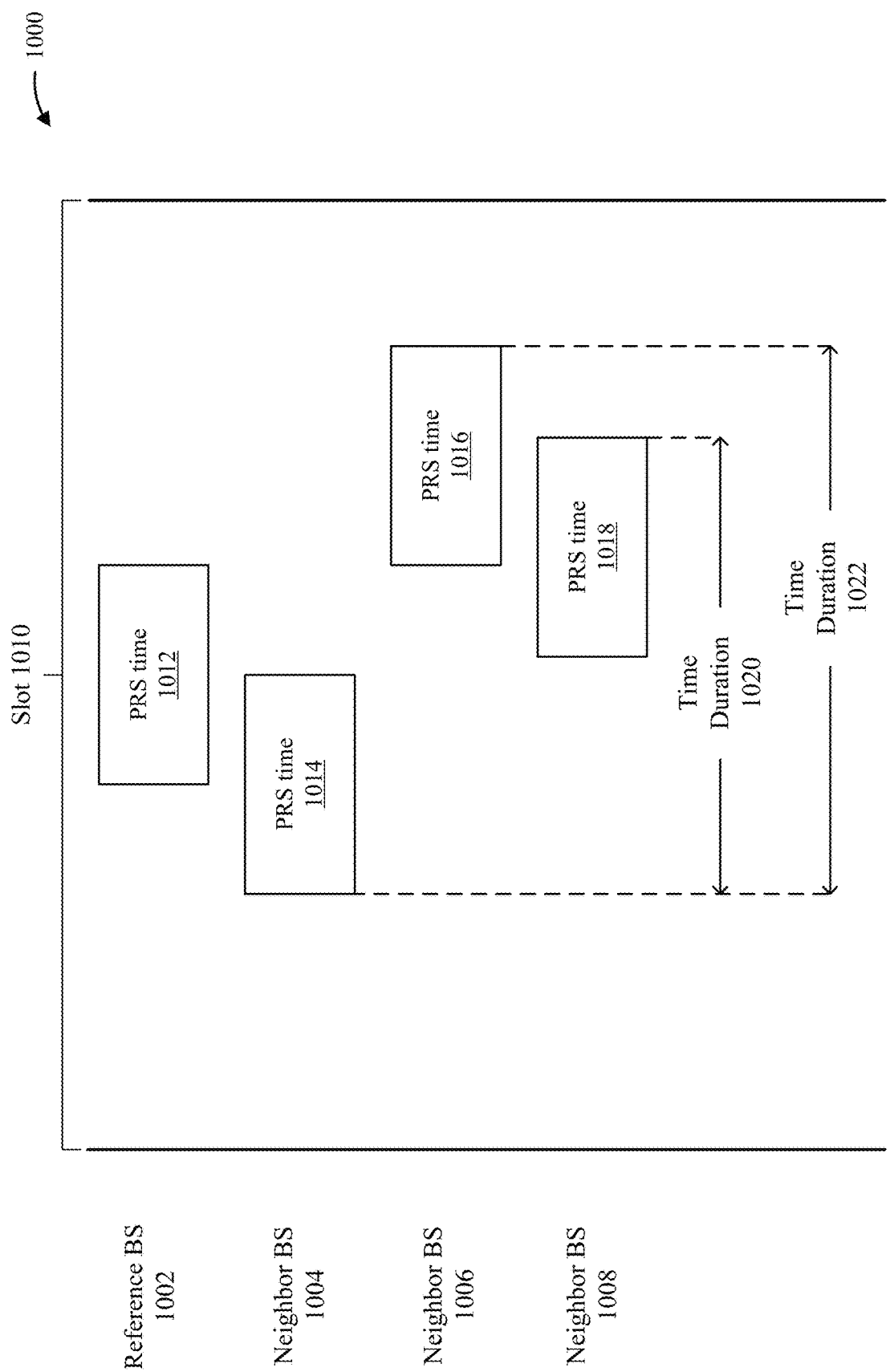
FIG. 10 illustrates a diagram of different example positioning reference signal (PRS) times associated with different base stations for wireless positioning.

FIG. 10 illustrates a diagram 1000 of different example PRS times 1012-1018 associated with different base stations 1002-1008 for wireless positioning. As used herein, a PRS time may refer to the time when the UE obtains a PRS from the base station. For example, base station 1002 is the serving (reference) base station for the UE. The UE may obtain a PRS from the reference base station 1002 during PRS time 1012 of slot 1010. The PRS time during a slot may refer to the potential symbols of the slot during which the PRS may occupy the slot. The UE may obtain a PRS from the neighbor base station 1004 at PRS time 1014 of the slot 1010, the UE may obtain a PRS from the neighbor base station 1006 at PRS time 1016 of the slot 1010, and the UE may obtain a PRS from the neighbor base station 1008 at PRS time 1018 of the slot 1010. The one or more of the RF chains (and the baseband processing system) of the UE are to remain in an active mode during the PRS times associated with the base stations selected as TRPs for wireless positioning of the UE. The time that the one or more RF chains (and the baseband processing system or other components) are to remain in an active mode associated with measuring the PRSs from a combination of candidate TRPs is referred to as a time duration (which may be during a slot). Time duration 1020 corresponds to base stations 1002, 1004, and 1008 being selected as TRPs for the UE (with base station 1006 being excluded as a TRP). A time duration during a slot may refer to the union of potential symbols over which one or more PRSs from the selected TRPs may occupy the slot. As depicted for time duration 1020, one or more RF chains of the UE may enter a low power mode for at least a portion of PRS time 1016 since the UE is not to listen for a PRS from neighbor base station 1006. Time duration 1022 corresponds to at least base stations 1004 and 1006 being selected as TRPs for the UE. As shown, time duration 1022 may be longer than time duration 1020 since the PRS time 1014 is further away in time from PRS time 1016 than PRS time 1018. In this manner, the UE may be required to be in an active mode for a longer or a shorter time duration based on the TRPs selected for wireless positioning of the UE. While not shown, a time duration may correspond to the union of PRS times 1012, 1016, and 1018 for base stations 1002, 1006, and 1008 being selected as TRPs for the UE (with base station 1004 being excluded as a TRP).

As noted above, the location server 172 may indicate which TRPs are to be configured for wireless positioning for the UE. The UE may obtain an indication of the one or more candidate TRPs that are selected, and the one or more selected TRPs are to transmit a PRS during a first portion of time (such as during an associated time duration as depicted in FIG. 10). The UE may place one or more RF chains of a wireless transceiver into an active mode for the first portion of time to measure the PRS from the one or more selected TRPs, and the UE may place the one or more RF chains from the active mode into a low power mode for a second portions of time (such as outside a time duration associated with the selected TRPs). The second portion of time may be during which the one or more selected TRPs do not transmit a PRS. For example, the second portion of time is associated with one or more unselected TRPs transmitting a PRS. In some implementations, all RF chains and the baseband processing system may be placed into the low power mode during the second portion of time, which may prevent the UE from measuring the PRS from the one or more unselected TRPs.

In some implementations, selection of one or more candidate TRPs for wireless positioning may be based on reducing a time duration associated with measuring the PRS from the one or more candidate TRPs to be selected. In addition or alternative to the UE determining one or more quality measurements (with selection of one or more preferred TRPs based on the one or more quality measurements), the UE may determine, for each of the one or more combinations of candidate TRPs, a time duration associated with measuring the PRS from the candidate TRPs. For example, determining the one or more preferred TRPs includes determining one or more preferred combinations of candidate TRPs (which may be based on one or more of the GDOPs, the quality measurements, or the time durations associated with the combinations). The indication to the network entity may indicate the time duration determined for each of the one or more preferred combinations of candidate TRPs. In this manner, selection of the one or more candidate TRPs to be used for wireless positioning of the UE (such as by a location server 172 obtaining the indicated time durations for the preferred combinations) may be based on reducing a time duration associated with measuring the PRS from the one or more candidate TRPs to be selected for wireless positioning. For example, the location server 172 may select the combination of candidate TRPs associated with the shortest time duration or a time duration less than a threshold. The location server 172 may take into account time durations for multiple UEs (as well as other metrics, such as GDOPs and/or quality measurements) to determine the final group of TRPs to be used for wireless positioning of the UEs. As noted above, the location server 172 may indicate the selection and additional information (such as timing of the PRS, frequency of the PRS, etc.) to the UE.

As noted above, determining the one or more preferred combinations of candidate TRPs may be based on the one or more time durations determined by the UE. For example, the UE may downselect the combinations of the candidate TRPs based on the time duration being less than a threshold. For example, in downselecting the combinations of candidate TRPs, the UE may determine a first time duration for a first combination of candidate TRPs associated with a first GDOP. The UE may also determine a second time duration for a second combination of candidate TRPs associated with a second GDOP. In some implementations, the second GDOP may be within a tolerance of the first GDOP. In this manner, the first GDOP and the second GDOP may be sufficiently similar that either the first combination or the second combination of candidate TRPs for wireless positioning is acceptable if based exclusively on GDOPs. In some implementations, both GDOPs may be less than a GDOP threshold used to downselect combinations of candidate TRPs based on the GDOP.

In comparing the first time duration and the second time duration, the second time duration may be greater than the first time duration. In this manner, if the second combination of candidate TRPs is selected, one or more components of the UE must remain in an active mode for longer than if the second combination of candidate TRPs is selected, increasing processing and power requirements of the UE. In some implementations, the UE may select the first combination of candidate TRPs over the second combination of candidate TRPs for the one or more preferred combinations of candidate TRPs based on the first time duration being less than the second time duration. In some implementations, the UE may determine if the first time duration is less than the second time duration by more than a tolerance or threshold amount of time. In some other implementations, the UE may exclude a combination of candidate TRPs if the associated time duration is greater than a threshold time duration.

Determining the time durations may be based on assistance data. For example, one or more gNBs may provide NR-DL-PRSs for wireless positioning. The serving base station (e.g., a serving gNB) or one or more neighbor base stations (e.g., gNBs) may provide one or more NR-DL-PRS-AssistanceData IEs. The one or more NR-DL-PRS-AssistanceData IEs may include, for one or more pairs of candidate TRP PRS resources (such as for the serving gNB and a neighbor gNB), an expected RSTD value of a NR-DL-PRS (NR-DL-PRS-ExpectedRSTD) and an uncertainty value of the NR-DL-PRS-ExpectedRSTD (NR-DL-PRS-ExpectedRSTD-Uncertainty) associated with the pair of candidate TRP PRS resources. The assistance data may indicate a time or the potential symbols over which PRSs may occupy a slot for a pair of TRPs, and such information may be used in determining a time duration for a combination of TRPs (such as based on assistance data for each pair of the serving gNB and a neighbor gNB in the combination). In this manner, the UE may determine the time durations (such as the first time duration and the second time duration from the above example) based on the one or more NR-DL-PRS-ExpectedRSTD and NR-DL-PRS-ExpectedRSTD-Uncertainty values. Example assistance data provided to the UE is described in release 16 of the 3GPP set of standards. In some implementations, the assistance data may identify the pair of base stations (TRPs). Also or alternatively, the assistance data may include a configuration of the NR-DL-PRS from one or both of the pair of base stations to assist the UE in listening for or measuring the PRSs from the pair of base stations.

In some implementations, the UE may provide an indication to a network entity one time, and the TRPs are selected for future wireless positioning of the UE. For example, if the UE is static (such as does not move more than a threshold distance), the selected TRPs may remain suitable for wireless positioning of the UE. However, the UE (such as a cellphone) may be mobile within the wireless network. In this manner, previously selected TRPs for wireless positioning may no longer be suitable for wireless positioning if the UE moves within the wireless network (which changes the geometry of the TRPs and the UE, which may impact the GDOP associated with the selected TRPs).

In some implementations, the wireless network 100 may be configured to adjust the TRPs to be used for wireless positioning of the UE. For example, the location server 172 may adjust (e.g., reselect) which TRPs are to be used for wireless positioning of the UE. The adjustment may be performed at any suitable time. For example, an adjustment (or determining whether an adjustment is to be performed) may be periodic. Also or alternatively, an adjustment may be trigger based. As used herein, adjustment of the TRPs may refer to one or more of excluding one or more previously selected TRPs or including one or more previously selected TRPs. Adjusting the TRPs may refer to reshaping the previously selected combination of TRPs for wireless positioning or selecting a new combination of TRPs for wireless positioning based on updated GDOPs or other information indicated by the UE (or one or more other UEs in the wireless network).

If the adjustment may be periodic, the UE may periodically provide the indication to the network entity. For example, the UE may periodically perform method 800, as described above. As noted above, movement of the UE may impact the GDOPs determined by the UE. In some implementations, the periodicity of providing the indication to the network entity (such as the periodicity of performing method 800) may be based on a movement of the UE. For example, the UE may determine its movement based on one or more IMU measurements or based on a succession of determined positions for the UE using wireless positioning. If the movement is greater than a threshold (such as a displacement being greater than a threshold, a speed being greater than a threshold, or any other suitable metric of movement of the UE), the UE may increase the periodicity of providing the indication to the network entity (which may be provided to the location server 172 to determine whether to adjust selection of the TRPs for the UE). In one example, increasing the periodicity may be a stepwise function associated with an increase in a speed or displacement of the UE, a linear function, or another correlation between a movement of the UE and when to provide an indication to the network entity. While some examples for determining the periodicity for providing an indication are provided, any suitable manner in determining the periodicity may be performed.

If providing an indication may be trigger based, the trigger may be based on a movement of the UE, a request from a location server 172, or another suitable trigger. For example, if the UE determines that a speed of the UE or a displacement of the UE is greater than a threshold, the UE may perform method 800 and provide an indication to a network entity, with the location server 172 determining new TRPs for wireless positioning for the UE based on the indication. In another example, the UE may obtain a request to provide the indication from the network entity. For example, the location server 172 may determine that an indication is to be requested from the UE. The location server 172 may send the request to the serving gNB via the core network 170, and the serving gNB may provide the request to the UE. Based on obtaining the request, the UE may provide the indication to the network entity (such as by performing the method 800). The indication may be forwarded by the network entity (such as the gNB) to the location server 172, which may select new TRPs for wireless positioning for the UE. When the location server 172 may request the indication may be determined in any suitable manner, such as periodically or by determining that the UE has moved based on previously determined positions for the UE. As noted above, once the TRPs are selected for wireless positioning and the UE and selected TRPs are configured, the UE may determine its position during UE-based positioning. Also or alternatively, the location server 172 may determine the UE's position during UE-assisted positioning.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation examples are described in the following numbered clauses:

1. A method performed by a user equipment (UE) in a wireless network for wireless positioning of the UE, including:
   determining one or more geometric dilution of precisions (GDOPs), including:
   for each combination of candidate transmit/receive points (TRPs) of one or more combinations of candidate TRPs from a plurality of candidate TRPs for wireless positioning, determining a GDOP associated with the combination of candidate TRPs; and
   providing, to a network entity in the wireless network, an indication associated with the one or more GDOPs, where one or more candidate TRPs of the plurality of candidate TRPs are to be used by the UE for wireless positioning of the UE based on the indication.
2. The method of clause 1, where the indication includes the one or more GDOPs determined by the UE.
3. The method of clause 2, further including:
   determining a plurality of GDOPs, including:
   for each combination of candidate TRPs of a plurality of combinations of candidate TRPs from the plurality of TRPs for wireless positioning, determining a GDOP associated with the combination of candidate TRPs, where the plurality of combinations of candidate TRPs includes the one or more combinations of candidate TRPs; and
   selecting the one or more GDOPs from the plurality of GDOPs determined by the UE, where the selection is based on a GDOP threshold.
4. The method of clause 3, where selecting the one or more GDOPs is based on each GDOP of the one or more GDOPs being greater than the GDOP threshold.

5. The method of clause 3, where selecting the one or more GDOPs is based on each GDOP of the one or more GDOPs being less than the GDOP threshold.
6. The method of clause 1, further including determining one or more preferred TRPs from the plurality of candidate TRPs based on the one or more GDOPs, where the indication indicates the one or more preferred TRPs.
7. The method of clause 6, further including determining one or more quality measurements of a positioning reference signal (PRS) from at least one candidate TRP of the plurality of candidate TRPs, where determining the one or more preferred TRPs is also based on the one or more quality measurements.
8. The method of clause 7, where the one or more quality measurements includes one or more of:
a signal to noise ratio (SNR); or
a reference signal received power (RSRP).
9. The method of clause 7, where determining the one or more preferred TRPs includes:
downselecting the plurality of candidate TRPs based on the one or more GDOPs; and
downselecting the downselected plurality of candidate TRPs based on the one or more quality measurements.
10. The method of clause 6, where the one or more candidate TRPs to be used by the UE for wireless positioning of the UE is also based on one or more indications of preferred TRPs from one or more other UEs in the wireless network.
11. The method of clause 6, further including:
obtaining an indication of the one or more candidate TRPs to be used by the UE for wireless positioning of the UE are selected, where the one or more candidate TRPs are to transmit a positioning reference signal (PRS) during a first portion of time;
placing one or more radio frequency (RF) chains of the UE into an active mode for the first portion of time to measure the PRS from the one or more candidate TRPs; and
placing the one or more RF chains of the UE from the active mode into a low power mode for a second portion of time during which the one or more candidate TRPs do not transmit a PRS.
12. The method of clause 11, further including placing all RF chains and a baseband processing system of the UE into the low power mode for the second portion of time, where:
the second portion of time is associated with one or more unselected TRPs transmitting a PRS; and
the RF chains and the baseband processing system being placed into the low power mode prevents the UE from measuring the PRS from the one or more unselected TRPs.
13. The method of clause 6, further including determining, for each combination of candidate TRPs of the one or more combinations of candidate TRPs, a time duration associated with measuring the PRS s from the combination of candidate TRPs, where:
determining the one or more preferred TRPs includes determining one or more preferred combinations of candidate TRPs, wherein the one or more combinations of candidate TRPs includes the one or more preferred combinations of candidate TRPs;
the indication indicates the time duration for each preferred combination of candidate TRPs of the one or more preferred combinations of candidate TRPs; and
the one or more candidate TRPs to be used by the UE for wireless positioning of the UE are based on the indication of the time duration for each preferred combination of candidate TRPs.
14. The method of clause 13, where determining the one or more preferred combinations of candidate TRPs is based on the one or more time durations.
15. The method of clause 14, where determining the one or more preferred combinations of candidate TRPs includes:
determining a first time duration for a first combination of candidate TRPs associated with a first GDOP;
determining a second time duration for a second combination of candidate TRPs associated with a second GDOP within a tolerance of the first GDOP, where the second time duration is greater than the first time duration; and
selecting the first combination of candidate TRPs over the second combination of candidate TRPs based on the first time duration being less than the second time duration.
16. The method of clause 15, further including obtaining one or more new radio (NR) downlink (DL) PRS assistance data (NR-DL-PRS-AssistanceData) information elements (IEs) associated with the candidate TRPs, where:
the one or more NR-DL-PRS-AssistanceData IEs include, for each pair of candidate TRP PRS resources of one or more pairs of candidate TRP PRS resources, an expected reference signal time difference value of a NR-DL-PRS (NR-DL-PRS-ExpectedRSTD) and an uncertainty value of the NR-DL-PRS-ExpectedRSTD (NR-DL-PRS-ExpectedRSTD-Uncertainty) associated with the pair of candidate TRP PRS resources; and
determining the first time duration and the second time duration is based on the NR-DL-PRS-ExpectedRSTD and NR-DL-PRS-ExpectedRSTD-Uncertainty value of the one or more NR-DL-PRS-AssistanceData IEs.
17. The method of clause 1, where a number of candidate TRPs to be included in a combination of candidate TRPs is adjustable.
18. The method of clause 1, further including obtaining a request to provide the indication from the network entity, where the UE provides the indication to the network entity based on obtaining the request.
19. The method of clause 1, where providing the indication to the network entity includes periodically providing a new indication to the network entity.
20. The method of clause 19, where the periodicity is based on a movement of the UE.
21. The method of clause 1, where the network entity is a base station serving the UE.
22. A user equipment (UE) in a wireless network configured for wireless positioning of the UE, including:
an at least one transceiver configured to:
provide, to a network entity in the wireless network, an indication associated with one or more geometric dilution of precisions (GDOPs), where one or more candidate transmit/receive points (TRPs) of a plurality of candidate TRPs are to be used by the UE for wireless positioning of the UE based on the indication;
at least one memory; and
at least one processor coupled to the at least one transceiver and the at least one memory, where the at least one processor is configured to determine the one or more GDOPs associated with the indication, including:

for each combination of candidate TRPs of one or more combinations of candidate TRPs from the plurality of candidate TRPs for wireless positioning, determine a GDOP associated with the combination of candidate TRPs.

23. The UE of clause 22, where the indication includes the one or more GDOPs determined by the UE.

24. The UE of clause 23, where the at least one processor is further configured to:
determine a plurality of GDOPs, including:
for each combination of candidate TRPs of a plurality of combinations of candidate TRPs from the plurality of TRPs for wireless positioning, determine a GDOP associated with the combination of candidate TRPs, where the plurality of combinations of candidate TRPs includes the one or more combinations of candidate TRPs; and
select the one or more GDOPs from the plurality of GDOPs determined by the UE, where the selection is based on a GDOP threshold.

25. The UE of clause 24, where selection of the one or more GDOPs is based on each GDOP of the one or more GDOPs being greater than the GDOP threshold.

26. The UE of clause 24, where selection of the one or more GDOPs is based on each GDOP of the one or more GDOPs being less than the GDOP threshold.

27. The UE of clause 22, where the at least one processor is further configured to determine one or more preferred TRPs from the plurality of candidate TRPs based on the one or more GDOPs, where the indication indicates the one or more preferred TRPs.

28. The UE of clause 27, where the at least one processor is further configured to determine one or more quality measurements of a positioning reference signal (PRS) from at least one candidate TRP of the plurality of candidate TRPs, where determining the one or more preferred TRPs is also based on the one or more quality measurements.

29. The UE of clause 28, where the one or more quality measurements includes one or more of:
a signal to noise ratio (SNR); or
a reference signal received power (RSRP).

30. The UE of clause 28, where the at least one processor, to determine the one or more preferred TRPs, is configured to:
downselect the plurality of candidate TRPs based on the one or more GDOPs; and
downselect the downselected plurality of candidate TRPs based on the one or more quality measurements.

31. The UE of clause 27, where the one or more candidate TRPs to be used by the UE for wireless positioning of the UE is also based on one or more indications of preferred TRPs from one or more other UEs in the wireless network.

32. The UE of clause 27, where the at least one transceiver is further configured to:
obtain an indication of the one or more candidate TRPs to be used by the UE are selected, where the one or more candidate TRPs are to transmit a positioning reference signal (PRS) during a first portion of time;
place one or more radio frequency (RF) chains of the at least one transceiver into an active mode for the first portion of time to measure the PRS from the one or more candidate TRPs; and
place the one or more RF chains of the at least one transceiver from the active mode into a low power mode for a second portion of time during which the one or more candidate TRPs do not transmit a PRS.

33. The UE of clause 32, where the at least one transceiver is further configured to place all RF chains and a baseband processing system of the UE into the low power mode for the second portion of time, where:
the second portion of time is associated with one or more unselected TRPs transmitting a PRS; and
the RF chains and the baseband processing system being placed into the low power mode is to prevent the UE from measuring the PRS from the one or more unselected TRPs.

34. The UE of clause 27, where the at least one processor is further configured to determine, for each combination of candidate TRPs of the one or more combinations of candidate TRPs, a time duration associated with measuring the PRS from the combination of candidate TRPs, where:
the at least one processor, to determine the one or more preferred TRPs, is further configured to determine one or more preferred combinations of candidate TRPs, where the one or more combinations of candidate TRPs includes the one or more preferred combinations of candidate TRPs;
the indication is to indicate the time duration for each preferred combination of candidate TRPs of the one or more preferred combinations of candidate TRPs; and
the one or more candidate TRPs to be used by the UE for wireless positioning of the UE are based on the indication of the time duration for each preferred combination of candidate TRPs.

35. The UE of clause 34, where the determination of the one or more preferred combinations of candidate TRPs is based on the one or more time durations.

36. The UE of clause 35, where the at least one processor, to determine the one or more preferred combinations of candidate TRPs, is further configured to:
determine a first time duration for a first combination of candidate TRPs associated with a first GDOP;
determine a second time duration for a second combination of candidate TRPs associated with a second GDOP within a tolerance of the first GDOP, where the second time duration is greater than the first time duration; and
select the first combination of candidate TRPs over the second combination of candidate TRPs based on the first time duration being less than the second time duration.

37. The UE of clause 36, where the at least one transceiver is further configured to obtain one or more new radio (NR) downlink (DL) PRS assistance data (NR-DL-PRS-AssistanceData) information elements (IEs) associated with the candidate TRPs, where:
the one or more NR-DL-PRS-AssistanceData IEs include, for each pair of candidate TRP PRS resources of one or more pairs of candidate TRP PRS resources, an expected reference signal time difference value of a NR-DL-PRS (NR-DL-PRS-ExpectedRSTD) and an uncertainty value of the NR-DL-PRS-ExpectedRSTD (NR-DL-PRS-ExpectedRSTD-Uncertainty) associated with the pair of candidate TRP PRS resources; and
determining the first time duration and the second time duration is based on the NR-DL-PRS-ExpectedRSTD and NR-DL-PRS-ExpectedRSTD-Uncertainty value of the one or more NR-DL-PRS-AssistanceData IEs.

38. The UE of clause 22, where a number of candidate TRPs to be included in a combination of candidate TRPs is adjustable.

39. The UE of clause 22, where the at least one transceiver is further configured to obtain a request to provide the indication from the network entity, where the UE is to provide the indication to the network entity based on obtaining the request.
40. The UE of clause 22, where the at least one transceiver is further configured to periodically provide a new indication to the network entity.
41. The UE of clause 40, where the periodicity is based on a movement of the UE.
42. The UE of clause 22, where the network entity is a base station serving the UE.
43. A non-transitory computer-readable medium storing instructions that, when executed by at least one processor of a user equipment (UE) in a wireless network configured for wireless positioning of the UE, causes the UE to:
determine one or more geometric dilution of precisions (GDOPs), including:
  for each combination of candidate transmit/receive points (TRPs) of one or more combinations of TRPs from a plurality of candidate TRPs for wireless positioning, determine, via the at least one processor, a GDOP associated with the combination of candidate TRPs; and
provide, via at least one transceiver of the UE and to a network entity in the wireless network, an indication associated with the one or more GDOPs, where one or more candidate TRPs of the plurality of candidate TRPs are to be used by the UE for wireless positioning of the UE based on the indication.
44. The computer-readable medium of clause 43, where the indication includes the one or more GDOPs determined by the UE.
45. The computer-readable medium of clause 44, further including instructions to cause the UE to:
determine a plurality of GDOPs, including:
  for each combination of candidate TRPs of a plurality of combinations of candidate TRPs from the plurality of TRPs for wireless positioning, determine a GDOP associated with the combination of candidate TRPs, where the plurality of combinations of candidate TRPs includes the one or more combinations of candidate TRPs; and
select the one or more GDOPs from the plurality of GDOPs determined by the UE, where the selection is based on a GDOP threshold.
46. The computer-readable medium of clause 45, where selection of the one or more GDOPs is based on each GDOP of the one or more GDOPs being greater than the GDOP threshold.
47. The computer-readable medium of clause 45, where selection of the one or more GDOPs is based on each GDOP of the one or more GDOPs being less than the GDOP threshold.
48. The computer-readable medium of clause 43, further including instructions to cause the UE to determine one or more preferred TRPs from the plurality of candidate TRPs based on the one or more GDOPs, where the indication indicates the one or more preferred TRPs.
49. The computer-readable medium of clause 48, further including instructions to cause the UE to determine one or more quality measurements of a positioning reference signal (PRS) from at least one candidate TRP of the plurality of candidate TRPs, where determining the one or more preferred TRPs is also based on the one or more quality measurements.
50. The computer-readable medium of clause 49, where the one or more quality measurements include one or more of:
a signal to noise ratio (SNR); or
a reference signal received power (RSRP).
51. The computer-readable medium of clause 49, where, to determine the one or more preferred TRPs, the computer-readable medium further includes instructions to cause the UE to:
downselect the plurality of candidate TRPs based on the one or more GDOPs; and
downselect the downselected plurality of candidate TRPs based on the one or more quality measurements.
52. The computer-readable medium of clause 48, where the one or more candidate TRPs to be used by the UE for wireless positioning of the UE is also based on one or more indications of preferred TRPs from one or more other UEs in the wireless network.
53. The computer-readable medium of clause 48, further including instructions to cause the UE to:
obtain, via the at least one transceiver, an indication of the one or more candidate TRPs to be used by the UE for wireless positioning of the UE are selected, where the one or more candidate TRPs are to transmit a positioning reference signal (PRS) during a first portion of time;
place one or more radio frequency (RF) chains of the at least one transceiver into an active mode for the first portion of time to measure the PRS from the one or more candidate TRPs; and
place the one or more RF chains of the at least one transceiver from the active mode into a low power mode for a second portion of time during which the one or more candidate TRPs do not transmit a PRS.
54. The computer-readable medium of clause 53, further including instructions to cause the UE to place all RF chains and a baseband processing system of the UE into the low power mode for the second portion of time, where:
the second portion of time is associated with one or more unselected TRPs transmitting a PRS; and
the RF chains and the baseband processing system being placed into the low power mode is to prevent the UE from measuring the PRS from the one or more unselected TRPs.
55. The computer-readable medium of clause 48, further including instructions to cause the UE to determine, for each combination of candidate TRPs of the one or more combinations of candidate TRPs, a time duration associated with measuring the PRSs from the combination of candidate TRPs, where:
to determine the one or more preferred TRPs, the computer-readable medium further includes instructions to cause the UE to determine one or more preferred combinations of candidate TRPs, where the one or more combinations of candidate TRPs includes the one or more preferred combinations of candidate TRPs;
the indication is to indicate the time duration for each preferred combination of candidate TRPs of the one or more preferred combinations of candidate TRPs; and
the one or more candidate TRPs to be used by the UE for wireless positioning of the UE are based on the indication of the time duration for each preferred combination of candidate TRPs.

56. The computer-readable medium of clause 55, where the determination of the one or more preferred combinations of candidate TRPs is based on the one or more time durations.
57. The computer-readable medium of clause 56, where, to determine the one or more preferred combinations of candidate TRPs, the computer-readable medium further includes instructions to cause the UE to:
determine a first time duration for a first combination of candidate TRPs associated with a first GDOP;
determine a second time duration for a second combination of candidate TRPs associated with a second GDOP within a tolerance of the first GDOP, where the second time duration is greater than the first time duration; and
select the first combination of candidate TRPs over the second combination of candidate TRPs based on the first time duration being less than the second time duration.
58. The computer-readable medium of clause 57, further including instructions to cause the UE to obtain, via the at least one transceiver, one or more new radio (NR) downlink (DL) PRS assistance data (NR-DL-PRS-AssistanceData) information elements (IEs) associated with the candidate TRPs, where:
the one or more NR-DL-PRS-AssistanceData IEs include, for each pair of candidate TRP PRS resources of one or more pairs of candidate TRP PRS resources, an expected reference signal time difference value of a NR-DL-PRS (NR-DL-PRS-ExpectedRSTD) and an uncertainty value of the NR-DL-PRS-ExpectedRSTD (NR-DL-PRS-ExpectedRSTD-Uncertainty) associated with the pair of candidate TRP PRS resources; and
determining the first time duration and the second time duration is based on the NR-DL-PRS-ExpectedRSTD and NR-DL-PRS-ExpectedRSTD-Uncertainty value of the one or more NR-DL-PRS-AssistanceData IEs.
59. The computer-readable medium of clause 43, where a number of candidate TRPs to be included in a combination of candidate TRPs is adjustable.
60. The computer-readable medium of clause 43, further including instructions to cause the UE to obtain, via the at least one transceiver, a request to provide the indication from the network entity, where the UE is to provide the indication to the network entity based on obtaining the request.
61. The computer-readable medium of clause 43, further including instructions to cause the UE to periodically provide, via the at least one transceiver, a new indication to the network entity.
62. The computer-readable medium of clause 61, where the periodicity is based on a movement of the UE.
63. The computer-readable medium of clause 43, where the network entity is a base station serving the UE.
64. A user equipment (UE) in a wireless network for wireless positioning of the UE, including:
means for determining one or more geometric dilution of precisions (GDOPs), including:
  means for, for each combination of candidate transmit/receive points (TRPs) of one or more combinations of candidate TRPs from a plurality of candidate TRPs for wireless positioning, determining a GDOP associated with the combination of candidate TRPs; and
means for providing, to a network entity in the wireless network, an indication associated with the one or more GDOPs, where one or more candidate TRPs of the plurality of candidate TRPs are to be used by the UE for wireless positioning of the UE based on the indication.
65. The UE of clause 64, where the indication includes the one or more GDOPs determined by the UE.
66. The UE of clause 65, further including:
means for determining a plurality of GDOPs, including:
  means for, for each combination of candidate TRPs of a plurality of combinations of candidate TRPs from the plurality of TRPs for wireless positioning, determining a GDOP associated with the combination of candidate TRPs, where the plurality of combinations of candidate TRPs includes the one or more combinations of candidate TRPs; and
means for selecting the one or more GDOPs from the plurality of GDOPs determined by the UE, where the selection is based on a GDOP threshold.
67. The UE of clause 66, where selecting the one or more GDOPs is based on each GDOP of the one or more GDOPs being greater than the GDOP threshold.
68. The UE of clause 66, where selecting the one or more GDOPs is based on each GDOP of the one or more GDOPs being less than the GDOP threshold.
69. The UE of clause 64, further including means for determining one or more preferred TRPs from the plurality of candidate TRPs based on the one or more GDOPs, where the indication indicates the one or more preferred TRPs.
70. The UE of clause 69, further including means for determining one or more quality measurements of a positioning reference signal (PRS) from at least one candidate TRP of the plurality of candidate TRPs, where determining the one or more preferred TRPs is also based on the one or more quality measurements.
71. The UE of clause 70, where the one or more quality measurements include one or more of:
a signal to noise ratio (SNR); or
a reference signal received power (RSRP).
72. The UE of clause 70, where the means for determining the one or more preferred TRPs includes:
means for downselecting the plurality of candidate TRPs based on the one or more GDOPs; and
means for downselecting the downselected plurality of candidate TRPs based on the one or more quality measurements.
73. The UE of clause 69, where the one or more candidate TRPs to be used by the UE for wireless positioning of the UE is also based on one or more indications of preferred TRPs from one or more other UEs in the wireless network.
74. The UE of clause 69, further including:
means for obtaining an indication of the one or more candidate TRPs to be used by the UE for wireless positioning of the UE are selected, where the one or more candidate TRPs are to transmit a positioning reference signal (PRS) during a first portion of time;
means for placing one or more radio frequency (RF) chains of the UE into an active mode for the first portion of time to measure the PRS from the one or more candidate TRPs; and
means for placing the one or more RF chains of the UE from the active mode into a low power mode for a second portion of time during which the one or more candidate TRPs do not transmit a PRS.
75. The UE of clause 74, further including means for placing all RF chains and a baseband processing system of the UE into the low power mode for the second portion of time, where:

the second portion of time is associated with one or more unselected TRPs transmitting a PRS; and
the RF chains and the baseband processing system being placed into the low power mode is to prevent the UE from measuring the PRS from the one or more unselected TRPs.

76. The UE of clause 69, further including means for determining, for each combination of candidate TRPs of the one or more combinations of candidate TRPs, a time duration associated with measuring the PRS s from the combination of candidate TRPs, where:
the means for determining the one or more preferred TRPs includes means for determining one or more preferred combinations of candidate TRPs, where the one or more combinations of candidate TRPs includes the one or more preferred combinations of candidate TRPs;
the indication indicates the time duration for each preferred combination of candidate TRPs of the one or more preferred combinations of candidate TRPs; and
the one or more candidate TRPs to be used by the UE for wireless positioning of the UE are based on the indication of the time duration for each preferred combination of candidate TRPs.

77. The UE of clause 76, where determining the one or more preferred combinations of candidate TRPs is based on the one or more time durations.

78. The UE of clause 77, where the means for determining the one or more preferred combinations of candidate TRPs includes:
means for determining a first time duration for a first combination of candidate TRPs associated with a first GDOP;
means for determining a second time duration for a second combination of candidate TRPs associated with a second GDOP within a tolerance of the first GDOP, where the second time duration is greater than the first time duration; and
means for selecting the first combination of candidate TRPs over the second combination of candidate TRPs based on the first time duration being less than the second time duration.

79. The UE of clause 78, further including means for obtaining one or more new radio (NR) downlink (DL) PRS assistance data (NR-DL-PRS-AssistanceData) information elements (IEs) associated with the candidate TRPs, where:
the one or more NR-DL-PRS-AssistanceData IEs include, for each pair of candidate TRP PRS resources of one or more pairs of candidate TRP PRS resources, an expected reference signal time difference value of a NR-DL-PRS (NR-DL-PRS-ExpectedRSTD) and an uncertainty value of the NR-DL-PRS-ExpectedRSTD (NR-DL-PRS-ExpectedRSTD-Uncertainty) associated with the pair of candidate TRP PRS resources; and
determining the first time duration and the second time duration is based on the NR-DL-PRS-ExpectedRSTD and NR-DL-PRS-ExpectedRSTD-Uncertainty value of the one or more NR-DL-PRS-AssistanceData IEs.

80. The UE of clause 64, where a number of candidate TRPs to be included in a combination of candidate TRPs is adjustable.

81. The UE of clause 64, further including means for obtaining a request to provide the indication from the network entity, where the UE is to provide the indication to the network entity based on obtaining the request.

82. The UE of clause 64, where the means for providing the indication to the network entity includes means for periodically providing a new indication to the network entity.

83. The UE of clause 82, where the periodicity is based on a movement of the UE.

84. The UE of clause 64, where the network entity is a base station serving the UE.

Therefore, it is intended that claimed subject matter not be limited to the particular examples disclosed, but that such claimed subject matter may also include all aspects falling within the scope of appended claims, and equivalents thereof.

What is claimed is:

1. An apparatus for wireless communication at a network entity, comprising:
a memory; and
at least one processor coupled to the memory and, based at least in part on information stored in the memory, the at least one processor is configured to:
receive, from a user equipment (UE), an indication associated with one or more geometric dilution of precisions (GDOPs), each GDOP of the one or more GDOPs being associated with one combination of candidate transmit/receive points (TRPs) of one or more combinations of candidate TRPs from a plurality of candidate TRPs for wireless positioning; and
determine a position of the UE based on the received indication associated with the one or more GDOPs.

2. The apparatus of claim 1, wherein the at least one processor is configured to determine the position of the UE further based on positioning information from a combination of candidate TRPs of the one or more combinations of candidate TRPs.

3. The apparatus of claim 2, wherein the at least one processor is further configured to select the combination of candidate TRPs for positioning the UE from the one or more combinations of candidate TRPs based on the received indication associated with the one or more GDOPs.

4. The apparatus of claim 3, wherein the at least one processor is further configured to exclude one or more TRPs from being selected before being configured to select the combination of candidate TRPs for positioning the UE.

5. The apparatus of claim 3, wherein the received indication indicates one or more TRPs preferred by the UE, wherein the at least one processor is configured to select the combination of candidate TRPs for positioning the UE further based on the indicated one or more TRPs.

6. The apparatus of claim 3, wherein the received indication indicates one or more TRPs excluded by the UE, wherein the at least one processor is configured to select the combination of candidate TRPs for positioning the UE further based on the indicated one or more TRPs.

7. The apparatus of claim 3, wherein the at least one processor is configured to select the combination of candidate TRPs for positioning the UE further based on information received from one or more other UEs.

8. The apparatus of claim 3, wherein the at least one processor is configured to select the combination of candidate TRPs for positioning the UE from the one or more combinations of candidate TRPs further based on reducing a time duration associated with the UE measuring positioning reference signals (PRS) from the combination of candidate TRPs.

9. The apparatus of claim 8, wherein the at least one processor is configured to select the combination of candidate TRPs for positioning the UE from the one or more combinations of candidate TRPs further based on the time duration associated with the UE measuring positioning reference signals (PRS) from the combination of candidate TRPs being less than a threshold time duration.

10. The apparatus of claim 1, wherein the received indication indicates the one or more GDOPs with a GDOP less than a GDOP threshold.

11. The apparatus of claim 1, wherein the received indication excludes GDOPs with a GDOP greater than a GDOP threshold.

12. The apparatus of claim 1, wherein the at least one processor is further configured to transmit a request for the indication associated with the one or more GDOPs, wherein the at least one processor is configured to receive the indication based on the transmitted request.

13. A method of wireless communication at a network entity, comprising:
  receiving, from a user equipment (UE), an indication associated with one or more geometric dilution of precisions (GDOPs), each GDOP of the one or more GDOPs being associated with one combination of candidate transmit/receive points (TRPs) of one or more combinations of candidate TRPs from a plurality of candidate TRPs for wireless positioning; and
  determining a position of the UE based on the received indication associated with the one or more GDOPs.

14. The method of claim 13, wherein the position of the UE is further determined based on positioning information from a combination of candidate TRPs of the one or more combinations of candidate TRPs.

15. The method of claim 14, further comprising selecting the combination of candidate TRPs for positioning the UE from the one or more combinations of candidate TRPs based on the received indication associated with the one or more GDOPs.

16. The method of claim 15, further comprising excluding one or more TRPs from being selected before the selecting the combination of candidate TRPs for positioning the UE.

17. The method of claim 15, wherein the received indication indicates one or more TRPs preferred by the UE, wherein the selecting the combination of candidate TRPs for positioning the UE is further based on the indicated one or more TRPs.

18. The method of claim 15, wherein the received indication indicates one or more TRPs excluded by the UE, wherein the selecting the combination of candidate TRPs for positioning the UE is further based on the indicated one or more TRPs.

19. The method of claim 15, wherein the selecting the combination of candidate TRPs for positioning the UE is further based on information received from one or more other UEs.

20. The method of claim 15, wherein the selecting the combination of candidate TRPs for positioning the UE from the one or more combinations of candidate TRPs is further based on reducing a time duration associated with the UE measuring positioning reference signals (PRS) from the combination of candidate TRPs.

21. The method of claim 20, wherein the selecting the combination of candidate TRPs for positioning the UE from the one or more combinations of candidate TRPs is further based on the time duration associated with the UE measuring positioning reference signals (PRS) from the combination of candidate TRPs being less than a threshold time duration.

22. The method of claim 13, wherein the received indication indicates the one or more GDOPs with a GDOP less than a GDOP threshold.

23. The method of claim 13, wherein the received indication excludes GDOPs with a GDOP greater than a GDOP threshold.

24. The method of claim 13, further comprising transmitting a request for the indication associated with the one or more GDOPs, wherein the indication is received based on the transmitted request.

25. An apparatus for wireless communication at a network entity, comprising:
  means for receiving, from a user equipment (UE), an indication associated with one or more geometric dilution of precisions (GDOPs), each GDOP of the one or more GDOPs being associated with one combination of candidate transmit/receive points (TRPs) of one or more combinations of candidate TRPs from a plurality of candidate TRPs for wireless positioning; and
  means for determining a position of the UE based on the received indication associated with the one or more GDOPs.

26. The apparatus of claim 25, wherein the position of the UE is further determined based on positioning information from a combination of candidate TRPs of the one or more combinations of candidate TRPs.

27. The apparatus of claim 26, further comprising means for selecting the combination of candidate TRPs for positioning the UE from the one or more combinations of candidate TRPs based on the received indication associated with the one or more GDOPs.

28. The apparatus of claim 25, wherein the received indication indicates the one or more GDOPs with a GDOP less than a GDOP threshold.

29. The apparatus of claim 25, further comprising means for transmitting a request for the indication associated with the one or more GDOPs, wherein the indication is received based on the transmitted request.

30. A computer-readable medium storing computer executable code at a network entity, the code when executed by a processor causes the processor to:
  receive, from a user equipment (UE), an indication associated with one or more geometric dilution of precisions (GDOPs), each GDOP of the one or more GDOPs being associated with one combination of candidate transmit/receive points (TRPs) of one or more combinations of candidate TRPs from a plurality of candidate TRPs for wireless positioning; and
  determine a position of the UE based on the received indication associated with the one or more GDOPs.

* * * * *